Nov. 14, 1967 J. R. SHAFFER 3,352,001
ASSEMBLING APPARATUS
Filed Oct. 7, 1965 17 Sheets-Sheet 1

INVENTOR,
J. R. SHAFFER
BY J. M. Presson
ATTORNEY

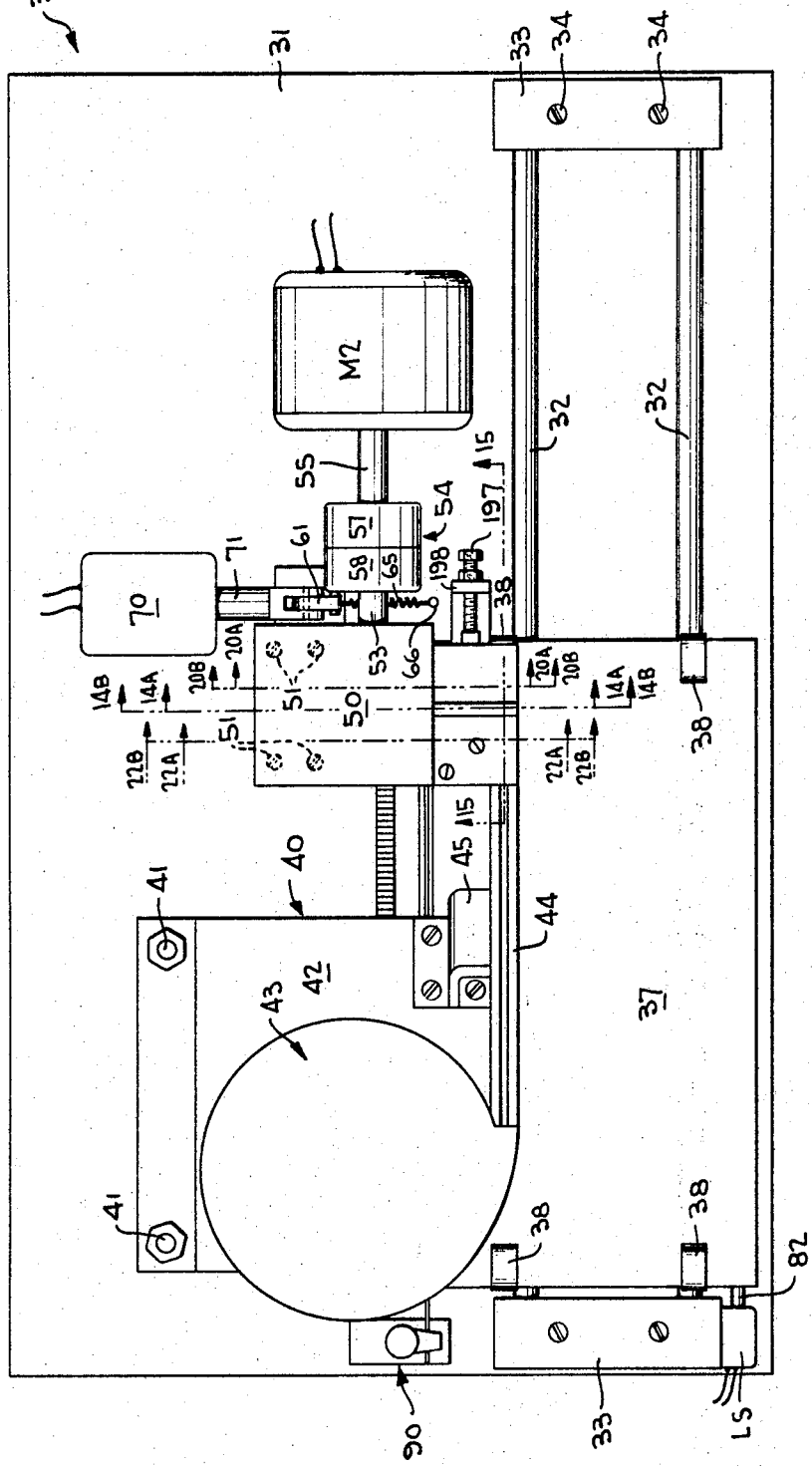

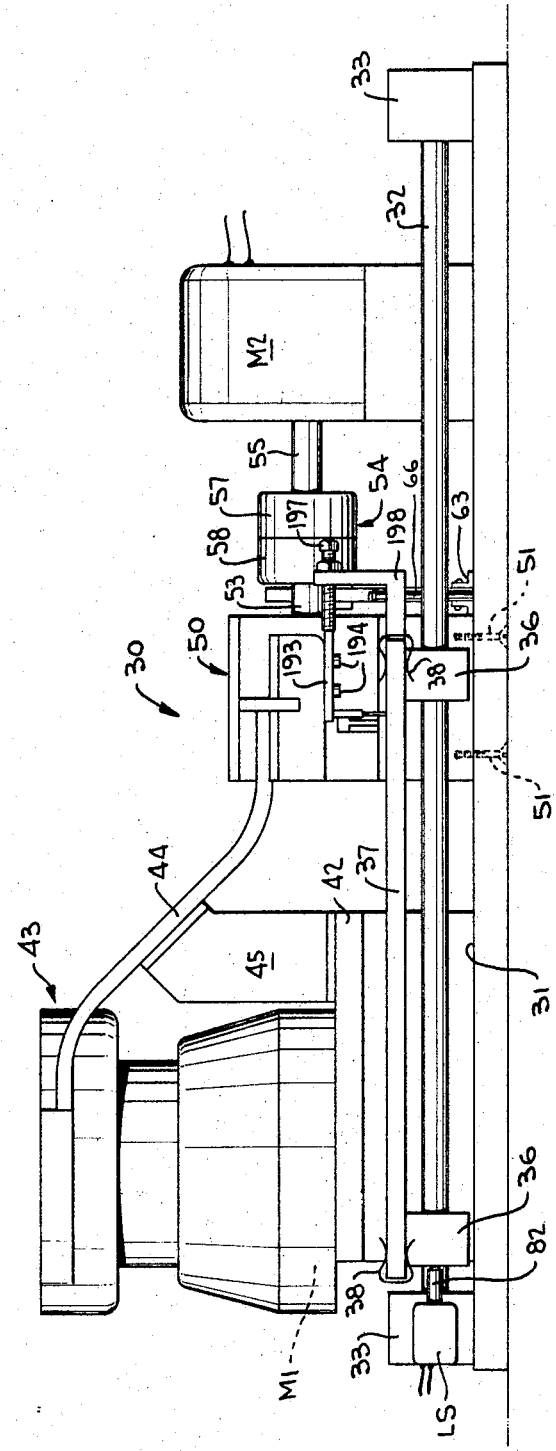

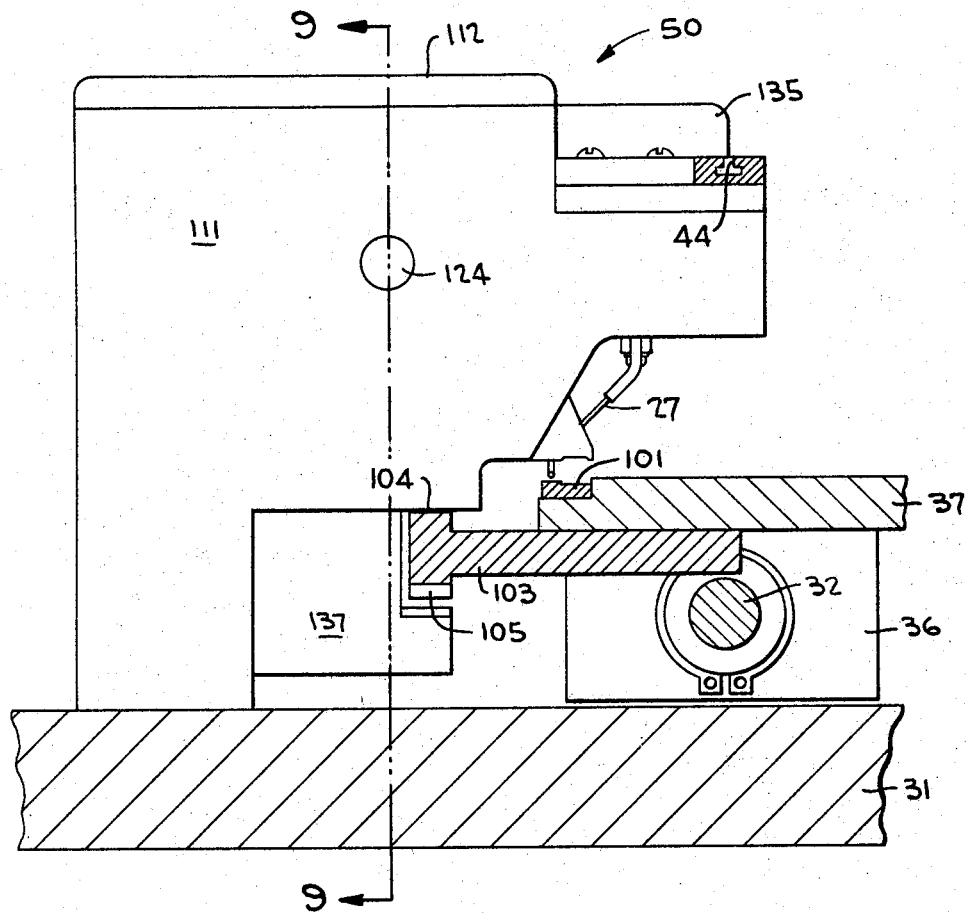

Nov. 14, 1967  J. R. SHAFFER  3,352,001
ASSEMBLING APPARATUS

Filed Oct. 7, 1965  17 Sheets-Sheet 8

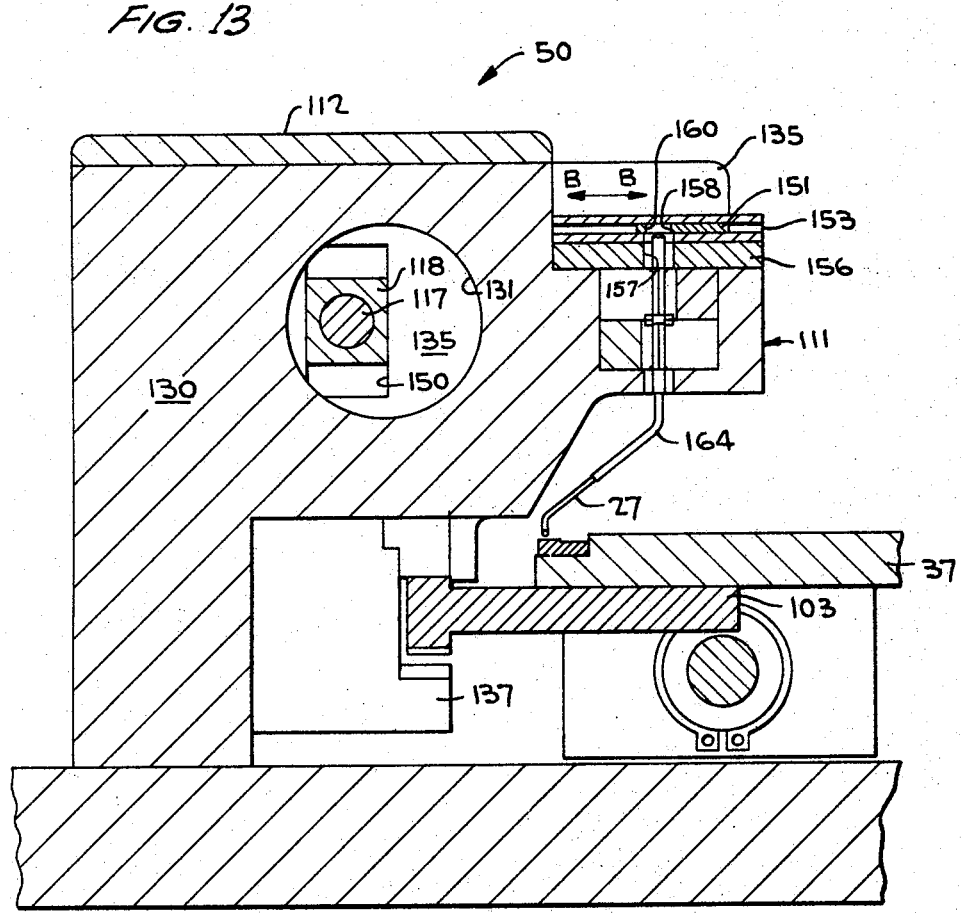

Nov. 14, 1967 J. R. SHAFFER 3,352,001
ASSEMBLING APPARATUS
Filed Oct. 7, 1965 17 Sheets-Sheet 11

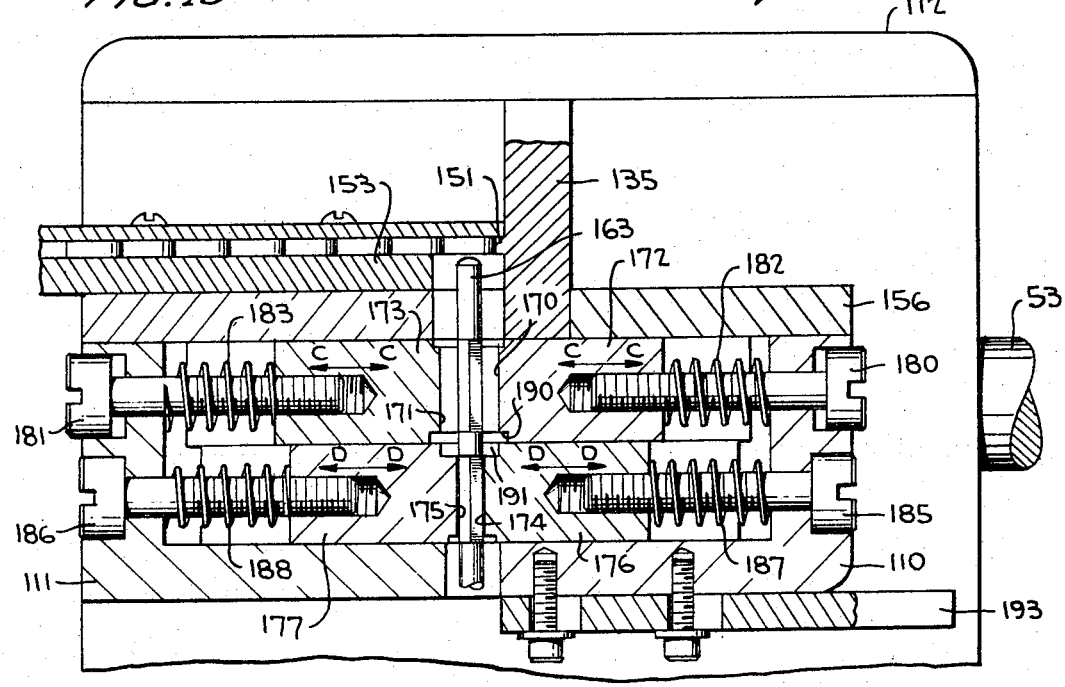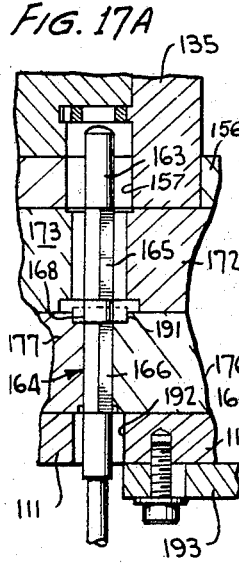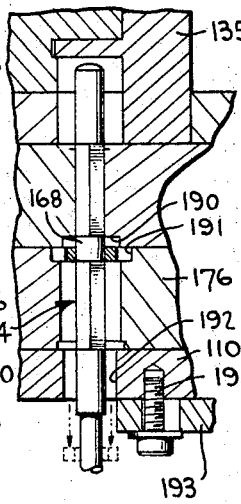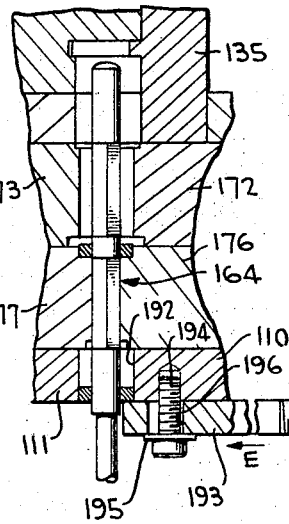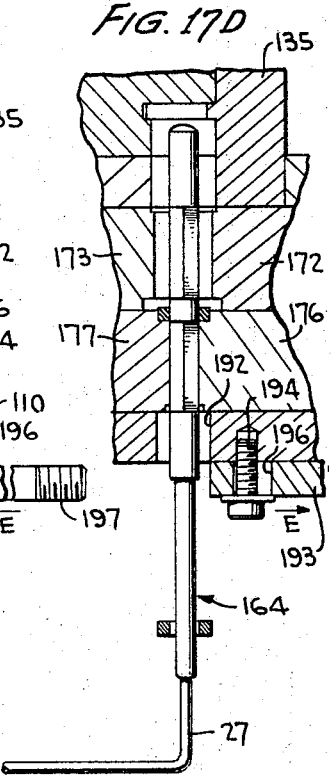

Nov. 14, 1967  J. R. SHAFFER  3,352,001
ASSEMBLING APPARATUS
Filed Oct. 7, 1965  17 Sheets-Sheet 13

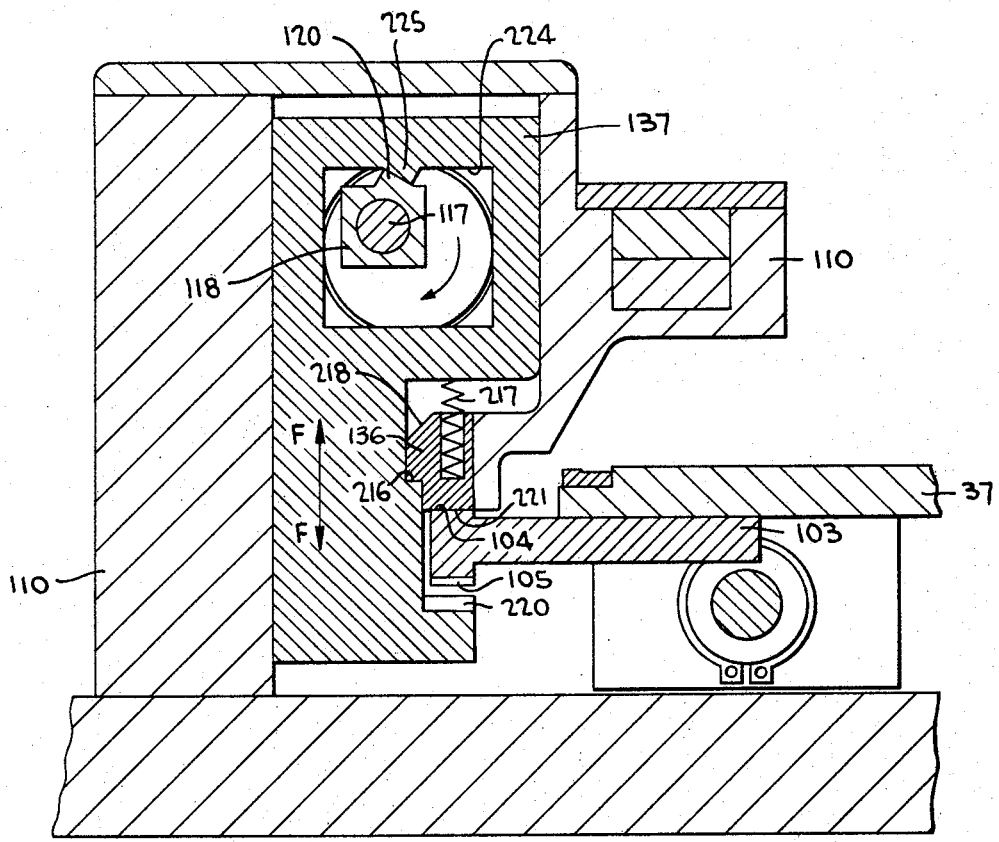

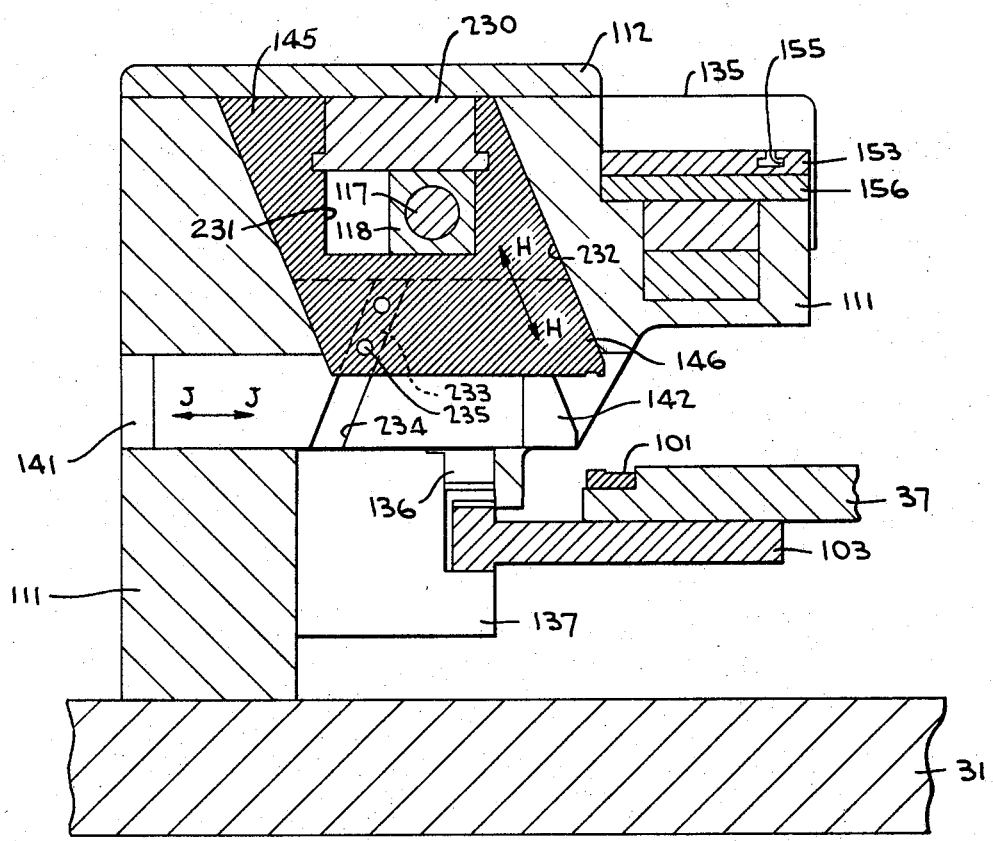

United States Patent Office 3,352,001
Patented Nov. 14, 1967

3,352,001
ASSEMBLING APPARATUS
John R. Shaffer, Upper Arlington, Columbus, Ohio, assignor to Western Electric Company, Incorporated, a corporation of New York
Filed Oct. 7, 1965, Ser. No. 493,700
12 Claims. (Cl. 29—203)

This invention relates generally to magnetic core memory components and more particularly to apparatus for assembling magnetic core memory planes.

Magnetic core memory planes of the type currently used in electronic telephone switching systems to provide a semipermanent memory for the switching system, typically comprise a rectangular plate composed of a rigid insulative material having parallel, spaced-apart conductive strips thereon. The longitudinal axes of the strips are oriented substantially perpendicular to the longitudinal axis of the rectangular plate and the strips are essentially U-shaped before individual magnetic cores of toroidal shape are threaded onto the strips. The rectangular plate is commonly known and referred to by those working in this art as a "solenoid plane," and the parallel conductive strips are known and referred to as "solenoid loops." The solenoid loops may be encapsulated in insulative tapes which are caused to adhere to, and cover, two permalloy sheets that are bonded to each side of the solenoid plane. The insulative tapes electrically insulate the individual solenoid loops and the permalloy sheets serve to increase the permeability of the medium that is adjacent the solenoid loops.

In accordance with conventional memory plane fabrication techniques, before the cores are threaded onto the U-shaped solenoid loops, the free ends of each loop extend beyond one of the longitudinal edges of the plane. Individual cores are threaded onto one of the free ends of each loop and the ends of each loop joined by, for example, soldering. With the cores hanging from the solenoid loops adjacent one edge of the solenoid plane, two parallel filaments or wires are threaded through all cores in a direction parallel to the horizontal plane of the solenoid plane. Each wire provides a single winding turn for the cores, one of the wires being a bias wire and the other wire, an X-selection wire. Individual Y-selection wires are subsequently threaded through each core, these wires lying in a plane substantially perpendicular to the plane of the bias and X-selection wires.

When the X-selection wire and one of the Y-selection wires are coincidently pulsed, the core that is positioned at the intersection of both wires will be energized such that the bias will be overcome and the flux state of the core changed. When the core undergoes a change of state, a current pulse is induced in the solenoid loop that is threaded through this core. The current pulse in the solenoid loop in turn induces a change in the magnetic field adjacent the solenoid loop and this magnetic field change is utilized to interrogate information stored in magnetic form, by typically a row of 45-bar magnets that are located adjacent and in coalignment with the longitudinal axis of each solenoid loop.

In a typical solenoid plane the lateral center-to-center distances between adjacent solenoid loops is generally on the order of .200 inch and is more typically .160 inch. In addition, there are typically sixty-four solenoid loops encapsulated in each solenoid plane. To manually thread the sixty-four closely spaced loops with individual cores is manifestly unfeasible when production requirements demand the assembly of large numbers of memory planes. The sixty-four magnetic cores have relatively small outer diameters, typically on the order of .190 inch and the concentric core apertures have diameters on the order of .125 inch. Because of the small size of the core apertures, the threading of two or more filamentary wires through all of the apertures evolves into a problem of substantial magnitude. The magnitude of this problem is increased in memory plane fabrication because the cores hang suspended from the solenoid loops in planes that are inclined to the horizontal plane of the solenoid plane, and hence to the direction of core threading. Further, the cores are threaded initially by the solenoid loops, which have significant widths compared to the diameters of the core apertures. Both of these factors contribute to reduce the effective diameter of the core apertures for threading with the bias and selection wires and correspondingly increase the difficulty of performing the threading operation.

Broadly, it is an object of this invention to provide apparatus for facilitating the assembly of an article.

More specifically, it is an object of this invention to provide apparatus for facilitating the assembly of a magnetic memory component of the type described hereinabove.

Another object of this invention is to provide apparatus for facilitating the assembly of a core memory component wherein the cores are threaded during movement to a position of connection with the memory component.

A further object of this invention is to provide apparatus for facilitating the assembly of a magnetic core memory component wherein, the cores are guided by a core-threading element to a position of connection with the memory component, and wherein the core-threading element facilitates the threading of at least one of the cores with a core winding filament.

Still another object of this invention is to provide an apparatus for facilitating the assembly of a magnetic core memory component wherein, the cores are guided by a core-threading element during movement of a position of connection with the memory component, and wherein at least one of the cores remains threaded by the element after being connected to the memory component.

In furtherance of the foregoing object, it is yet another object of this invention to affix the cores to the memory component while the cores are threaded by the core-threading element.

A complete understanding of this invention may be had by reference to the following detailed description and the accompanying drawings illustrating a specific embodiment thereof, wherein:

FIG. 4 is a plan view of the apparatus that is constructed in accordance with the principles of this invention;

FIG. 5 is a front view of the apparatus illustrated in FIG. 4;

FIG. 7 is a side view of a mechanism that fabricates an almost completely assembled memory plane such as illustrated by FIG. 2 from a solenoid plane such as illustrated by FIG. 1;

FIG. 13 is a sectional view of the mechanism of FIG. 8 taken along section lines 13—13 in that figure;

FIG. 15 is a sectional view of the core transfer assembly taken along section lines 15—15 in FIG. 4;

Figure 18A:
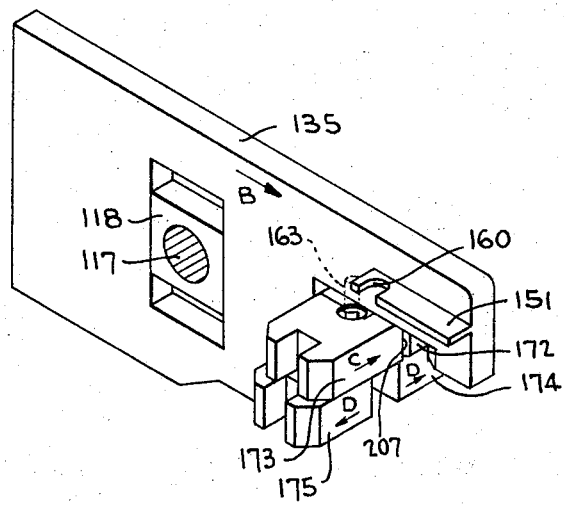
Figure 18B:
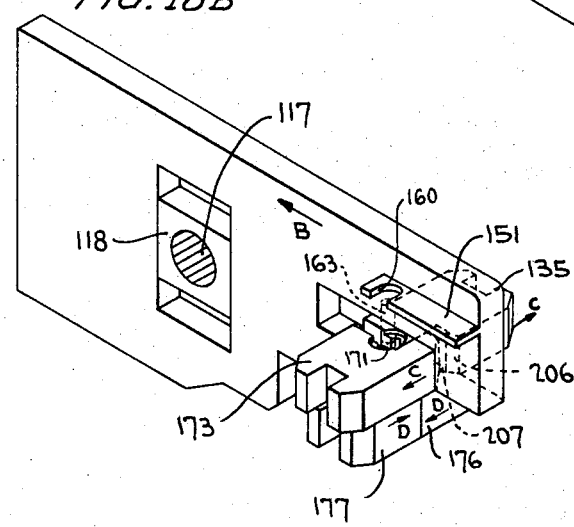
Figure 19A:
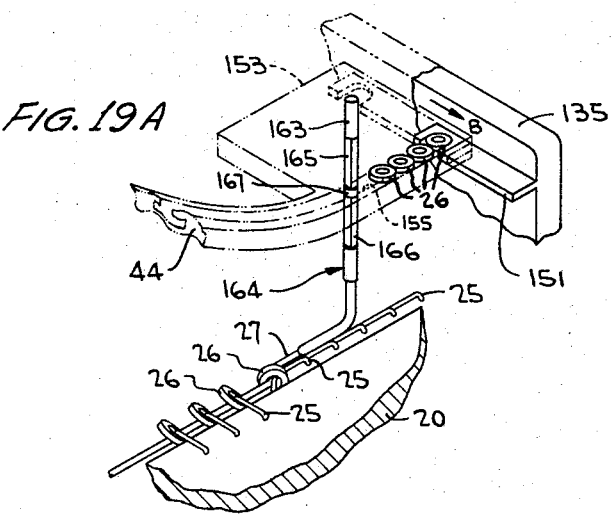
Figure 19B:
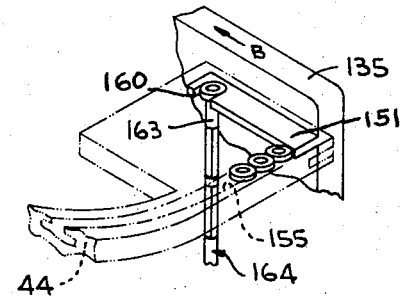
Figure 20B:
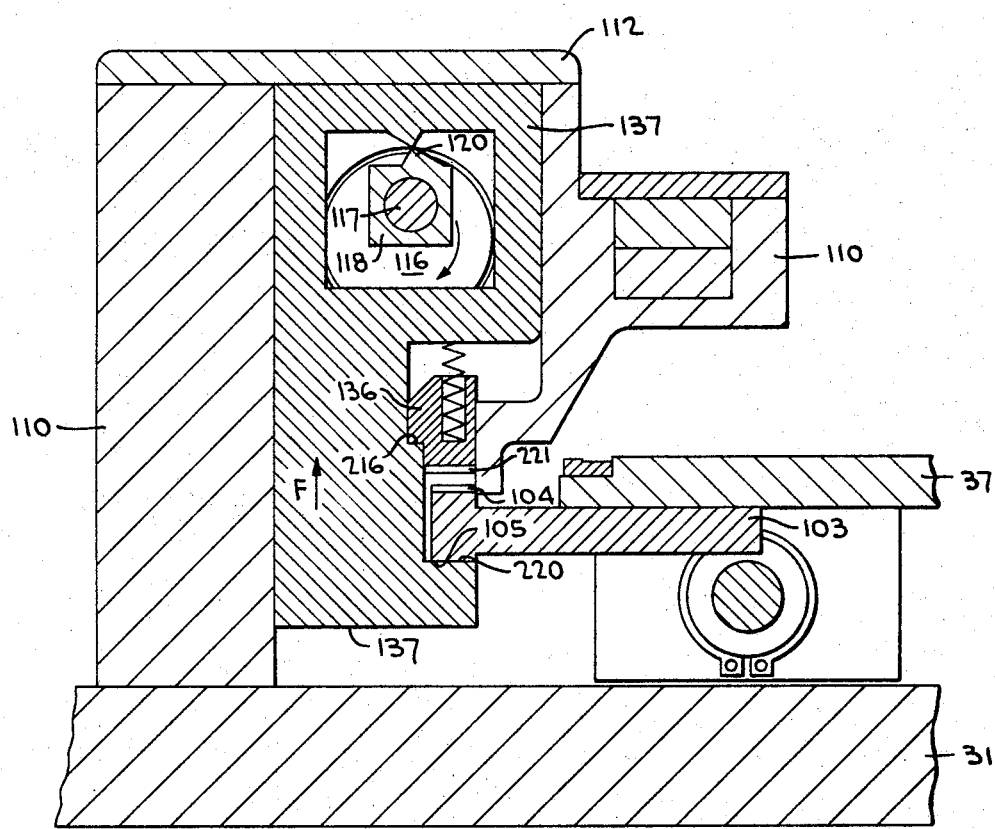
Figure 21A:
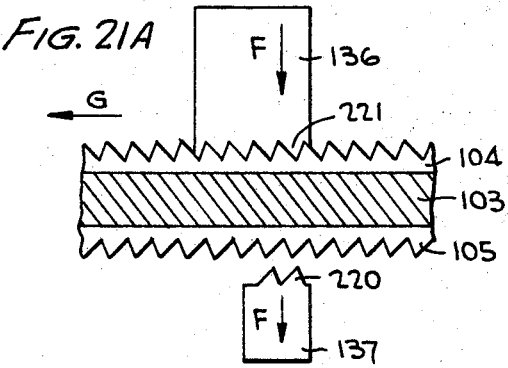
Figure 21B:
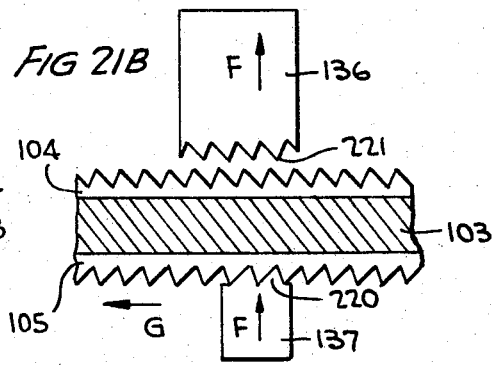
Figure 22B:
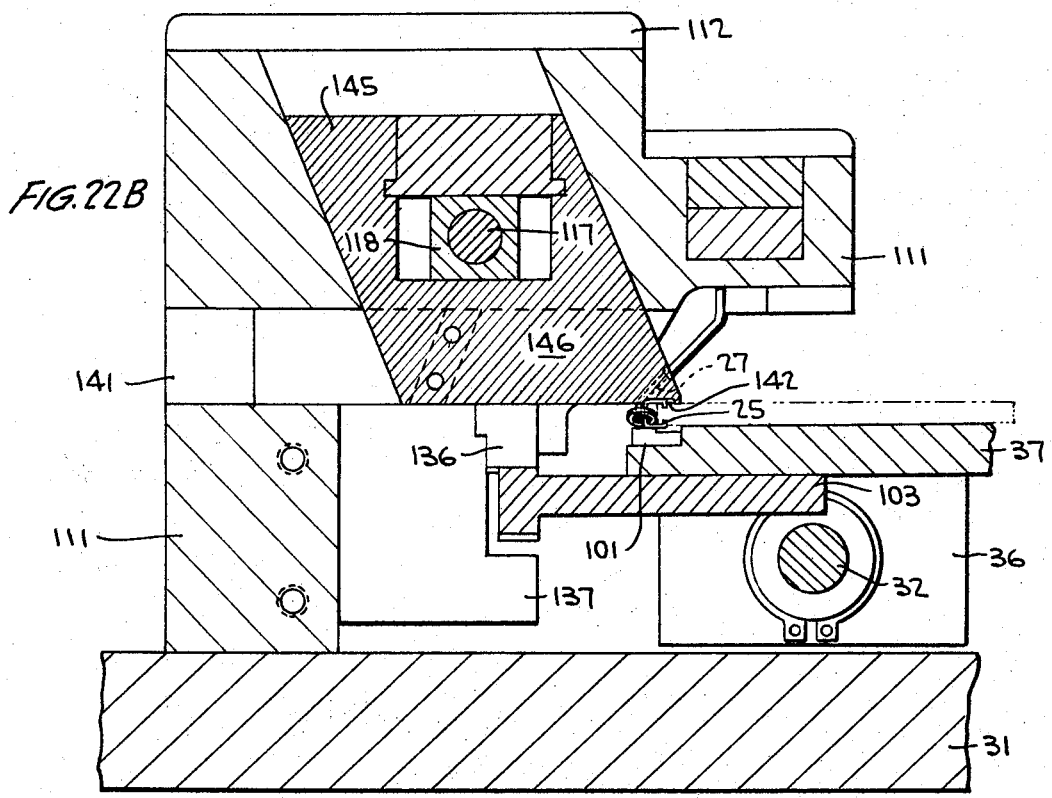
Figure 23:
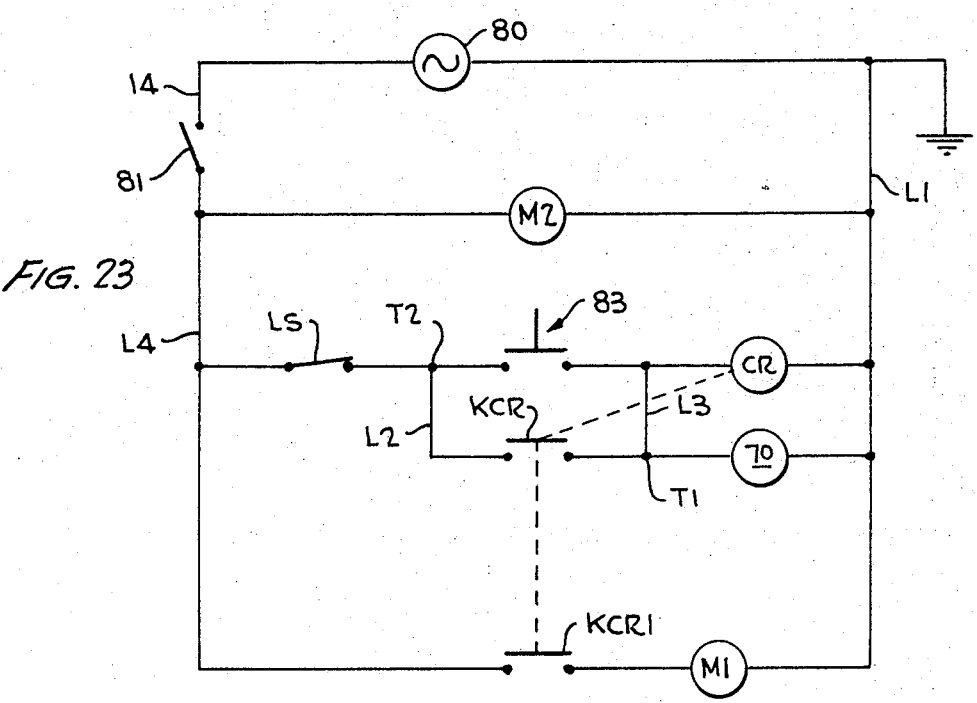

FIGS. 17A–17D schematically illustrate various positions of the two jaw pairs as well as mechanism associated therewith for selectively releasing a core to a core-threading tube;

FIGS. 18A and 18B are perspective views of the two jaw pairs at their respective extreme separated positions and further show the corresponding extreme positions of a slide that effects the separation of the two jaw pairs;

FIGS. 19A and 19B are perspective views that illustrate, with some degree of exaggeration, the transfer of a core to the core-threading tube;

FIGS. 20A and 20B are sections taken along section lines 20A—20A and 20B—20B, respectively, in FIG. 4 and illustrate two positions of a table and solenoid plane indexing assembly that is constructed in accordance with this invention;

FIGS. 21A and 21B are sectional views illustrating the successive indexing movements of the table that are effected by the successive operation of the indexing assembly;

FIGS. 22A and 22B are sectional views taken along section lines 22A—22A and 22B—22B, respectively, in FIG. 4, and respectively illustrate two positions of a comb aligning and staking assembly that is constructed in accordance with principles of the instant invention;

FIG. 23 illustrates circuitry and components for effectuating the desired operation of the apparatus of this invention.

According to one embodiment of this invention, an apparatus is provided for assembling an article that may be mounted in the apparatus for movement in at least one direction. The article incorporates at least one element-threading member, the element received by the member being typically cored with a central aperture. The apparatus includes a tube having one section that threads and guides the cord element to thread the member at a core-threading station in the apparatus. The tube is also provided with a second section that extends in the one direction of article movement and close enough to the path of movement of the member to remain threaded by the cored element upon the subsequent movement of the core-threaded member from the core-threading station. Since the cored element remains threaded by the tube after its movement from the core-threading station, the threading of the cored element may be facilitated by appropriate use of the tube.

Figure 1:
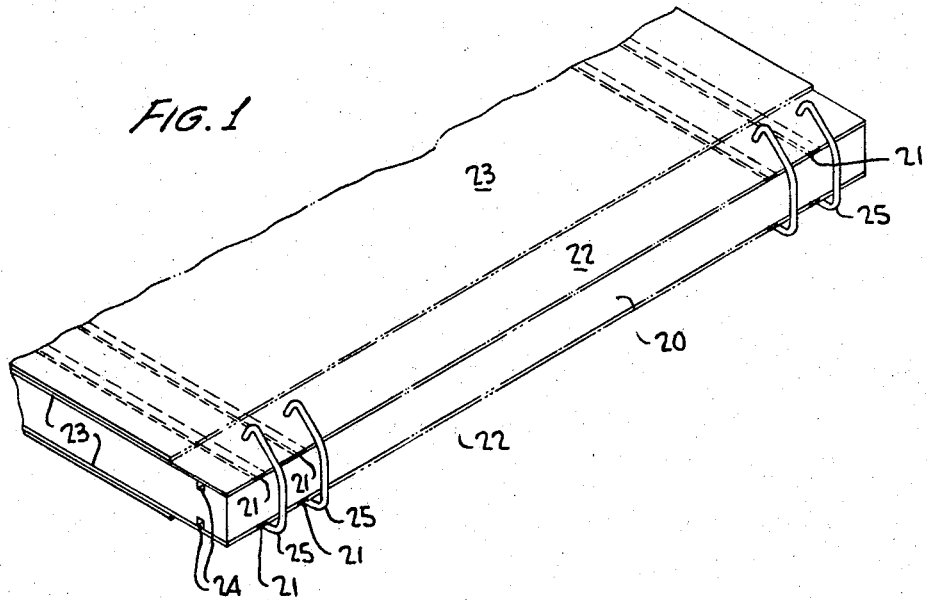
FIG. 1 is a perspective of a portion of a typical solenoid plane.

Referring now to FIG. 1 of the drawing for a more complete understanding of the invention, there is shown a typical glass and mica bonded solenoid plane 20 as it is received for core assembly.

The solenoid plane 20 typically mounts sixty-four spaced-apart, parallel solenoid loops 21. The solenoid loops 21 may be formed by U-shaped copper strips that are encapsulated in top and bottom tapes 22—22 composed of insulating material, such as Mylar. The top and bottom tapes 22—22 are respectively bonded to the top and bottom surfaces of the solenoid plane 20. Top and bottom permalloy sheets 23—23 are bonded to the outer surfaces of the top and bottom tapes 22—22. The longitudinal edges of the sheets 23—23 are typically spaced .700 inch inwardly from a pair of top and bottom parallel grooves 24—24 that are formed in the top and bottom surfaces, respectively, of the solenoid plane 20.

The grooves 24—24 extend parallel and adjacent one of the longitudinal edges of the plane 20 and are spanned transversely by the ends of the solenoid loops 21 and are covered by the tapes 22—22. A row of vertically-oriented, parallel wire combs 25 corresponding in number to the number of solenoid loops 21 have diameters slightly smaller than the width of the grooves 24 and upwardly bent tips that are forced into the bottom groove 24. The lateral center-to-center distance between adjacent combs is typically .160 inch. The upwardly bent tips of the individual combs 25 penetrate the bottom solenoid loops 21 adjacent the end thereof and the bottom insulative tape 22 and affix the combs 25 to the plane 20. The upwardly inclined or free end of each comb 25 projects above and inwardly of the upper surface of the plane 20 at an inclination of approximately 45 degrees with respect thereto. The downwardly bent tips formed on the extremities of the free ends of the combs 25 are in positions to be staked into the top groove 24.

Figure 2:
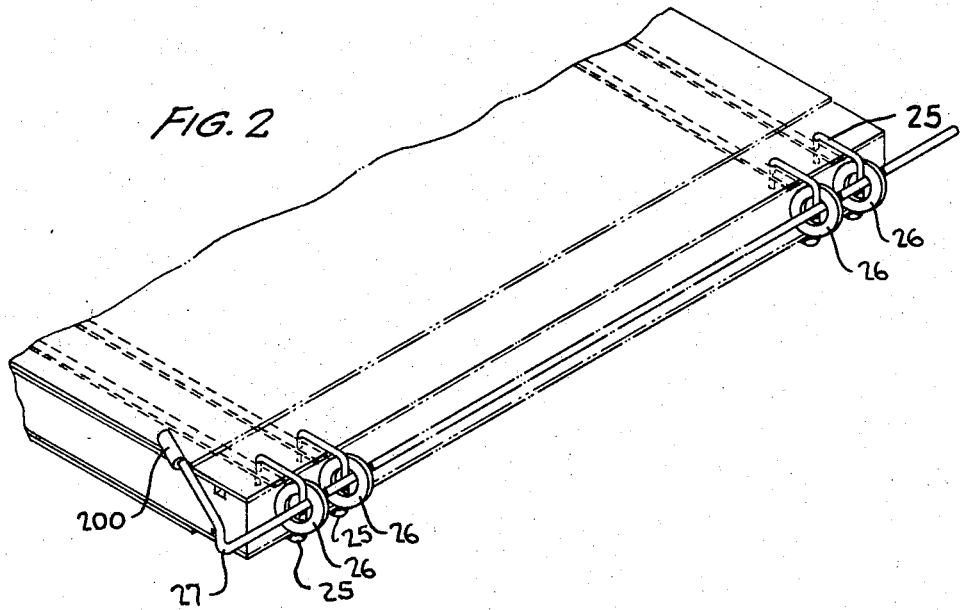
FIG. 2 is a perspective of a portion of a typical almost completely fabricated memory plane, that is assembled from a typical solenoid plane by the apparatus of the instant invention.

FIG. 2 illustrates a typical memory plane assembled to an extent made possible by the apparatus of this invention. As may be seen in this figure, the hitherto free ends of the combs 25 are clinched into the top groove 24 penetrating the top ends of the solenoid loops 21 as well as the top insulated tape 22. The vertical portions of the individual combs 25 are spaced from the adjacent edge of the solenoid plane 20 to accommodate individual toroidal magnetic cores, designated generally by the numeral 26 which are threaded by the combs 25. The cores 26 are also threaded by a single tube 27 that facilitates the threading of all cores 26 with a bias wire (not shown) and an X-selection wire (not shown), both of these wires being common to all cores 26.

Figure 3:
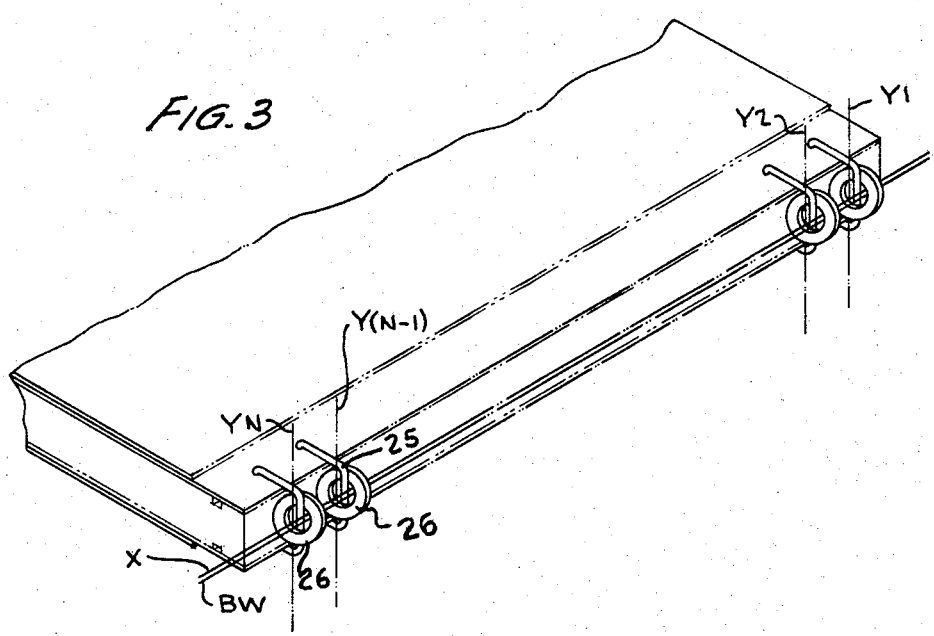
FIG. 3 is a perspective of a portion of a completely fabricated memory plane.

FIG. 3 illustrates the memory plane with the tube 27 withdrawn from the cores 26 leaving in its place a bias selection wire, designated BW, and an X-selection wire, designated X. As a final step in assembling the memory plane, each core 26 may be manually or otherwise threaded with a single vertical Y-selection wire, these wires being depicted by phantom lines in FIG. 3 and referred to as Y1, Y2 . . . YN; where N is equal to the number of cores 26.

FIGS. 4 and 5 illustrate the apparatus which receives the solenoid plane illustrated in FIG. 1 and produces the memory plane illustrated in FIG. 2. The apparatus is designated generally by the numeral 30 and is mounted on a stationary rectangular base 31. A pair of parallel liner rods 32—32 are received by a pair of end blocks 33—33 that are fixed to the base 13 by screws 34.

As best seen in FIG. 5, two pairs of bearing blocks 36—36 are mounted for reciprocative movement on the liner rods 32—32, only one block of each pair, however, being in evidence in the drawings. A rectangular table 37 is mounted stationary on the bearing blocks 36—36 by any suitable means. Two pairs of U-shaped springs clips 38—38, FIG. 4, may be inserted onto the opposite ends of the table 37 to clamp a comb-carrying solenoid plane 20, FIG. 1, stationary on the upper surface of the table 37.

A bracket 40, FIG. 4, of substantially Z cross-sectional shape, is mounted on the upper surface of the base 31 and is secured thereto at 41. The bracket 40 forms an elevated horizontal platform 42, FIG. 5, that extends to a position adjacent and above the innermost liner rod 32. A vibratory core feeder 43, of conventional type, is mounted on the platform 42 and is vibrated by an internal motor M1. The vibration imparted to the core feeder 43 by the motor M1 causes cores supplied to the bowl of the feeder 43 to vibrate from the feeder and slide by gravity down a track 44 having a core guiding slot of substantially inverted T cross-sectional shape. The track 44 is supported by a vertical support member 45 that is fixed to the upper surface of the platform 42 by machine screws (not shown). The track 44 conveys a single file of cores 26 from the periphery of the feeder bowl to a mechanism designated generally by the numeral 50. The mechanism 50 is secured to the base 31, for example, by screws 51, and performs the functions required to fabricate the memory plane illustrated in FIG. 2 from the solenoid plane illustrated in FIG. 1. The internal structure of the mechanism 50 will be disclosed in greater detail subsequently, and therefore, it suffices to state at this point in the specification that a single input drive shaft 53 drives the mechanism 50 so that the desired functions are performed thereby.

Figure 6:
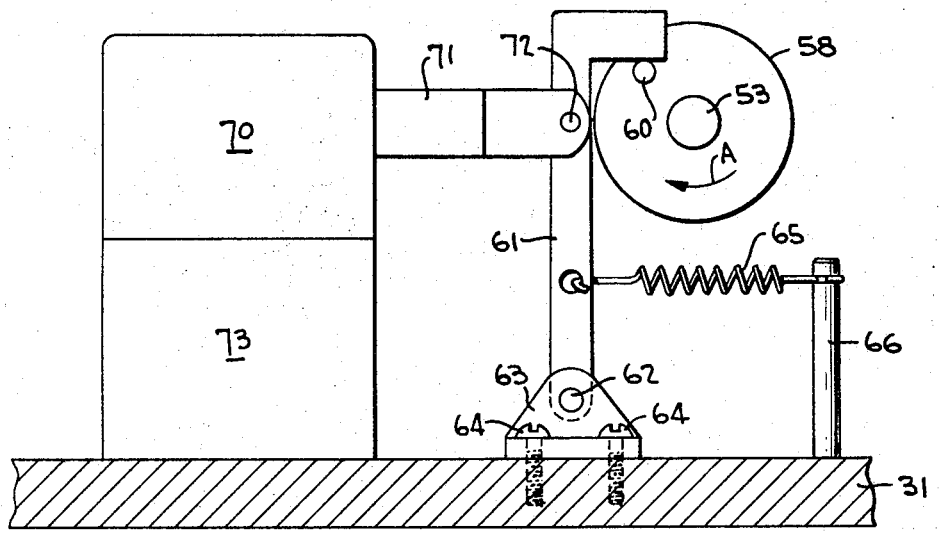
FIG. 6 illustrates mechanism that is energized to respectively start and stop the operation of the apparatus at the beginning and end of an assembly operation.

The shaft 53 of the mechanism 50 is coupled by a conventional slip clutch 54 to the output drive shaft 55 of a motor M2. The slip clutch 54, FIG. 5, includes a drive plate 57 and a driven plate 58, the drive plate 57 being rotated clockwise, as viewed from the left end of the apparatus 30, by the motor M2 to impart unidirectional torque and rotation to the driven plate 58. Referring to FIG. 6, a pin 60, positioned eccentrically on the driven plate 58, projects from and rotates with the plate 58 in a clockwise direction relative to the left end of the apparatus 30, as indicated by the arrow A. The pin 60 may be intercepted and held against rotation in the direction of arrow A by an L-shaped catch 61. When the catch 61 engages the pin 60, the pin 60 will be typically at 45 degrees before top dead center as viewed from the left end of the apparatus 30. A lower end of the catch 61 is mounted for pivotal movement upon a pivot pin 62 extending through a bracket 63 that is secured to the base 31 by machine screws 64. A coil spring 65 is connected at one end thereof to the catch 61 and at the opposite end thereof to a vertical post 66 fixed to the base 31. The coil spring 65 continuously urges the upper or free end of the catch 61 toward engagement with the pin 60. The free end of the catch 61, however, is under the control of an electromagnetic solenoid 70 through a connection effected between the free end of the catch 61 and a bifuracted solenoid rod 71 by a connecting pin 72. When the solenoid 70 is electrically energized the rod 71 is pulled into the solenoid 70 and when the solenoid is de-energized the rod 71 is released by the solenoid. The solenoid 70 is mounted in an elevated, stationary position upon a stationary support block 73.

As may be seen in FIG. 23, the solenoid 70 is connected between a lead L1 and a terminal T1. The lead L1 is connected to the grounded terminal of an A.C. source of power 80 and the terminal T1 may receive current from a terminal T2 through either lead L2 or lead L3. The terminal T2 will receive current from lead L4 which is connected to the other terminal of the A.C. source 80 when the internal contacts of a limit switch LS are closed and if a single pole-single throw switch 81 is also closed. The switch 81 may be manually closed to initiate the operation of the apparatus 30, and may be opened at any time to stop and preclude further operation of the apparatus 30.

Referring to FIGS. 4 and 5, the limit switch LS is affixed to one end of the left block 33 and has an actuator arm 82 that is positioned to be depressed by the left bearing block 36 when the table 37 is indexed to the predetermined limit of displacement to the left as viewed in these figures. When the actuator arm 82 is depressed by the bearing block 36, the normally closed internal contacts of the limit switch LS open. Referring again to FIG. 23, a normally open pushbutton type switch 83 is in series with the terminal T2 and with one terminal of a control relay CR that controls the operation of contacts KCR and KCR1. The other terminal of the control relay CR is connected to the ground lead L1. The normally open contacts KCR are in the locking circuit of the control relay CR and the normally open contacts KCR1 in series with the motor M1, maintain the motor M1 deenergized. Since the terminals of the solenoid 70 are in parallel with the control relay CR, when the relay CR is energized the solenoid 70 will also be energized; and conversely, when the relay CR is deenergized, the solenoid 70 will be deenergized.

To initiate a cycle of operation of the apparatus 30, the operator closes the switch 81 to energize the motor M2 and then depresses the pushbutton switch 83 to momentarily connect the control relay CR across the terminals of the A.C. source 80. The contacts of the limit switch LS normally will be closed at this time because the table 37, FIGS. 4 and 5, will be located at its extreme right position on the apparatus 30. The closure of the contacts KCR locks the control relay CR in the operative state and therefore the subsequent release of the pushbutton switch 83 will not affect the now energized states of both the control relay CR and the solenoid 70. The closure of the contacts KCR1 initiates the energization of the vibratory feeder motor M1, FIG. 5, which vibrates the core feeder 43 and supplies the mechanism 50 with cores.

As mentioned above, the initial closure of the switch 81 effects the energization of the drive motor M2 and drives the plate 57 of the slip clutch 54. When the solenoid 70 is energized, the solenoid rod 71, FIG. 6, will pull in and pivot the catch 61 far enough to release the pin 60 for rotation in the direction of arrow A. With the pin 60 and the plate 58 free to rotate, the torque imparted to the plate 58 by rotation of the plate 57 will drive the shaft 53 in the direction of arrow A.

The table 37, FIG. 5, will then be indexed by operation of the mechanism 50 until the block 36 actuates the limit switch LS and opens the internal contacts of the limit switch LS. When the limit switch LS opens, FIG. 23, the control relay CR will be deenergized and reopen the contacts KCR and KCR1. The solenoid 70 and the motor M1 will then be deenergized. The deenergization of the solenoid 70, FIG. 6, releases the solenoid rod 71 and allows the hitherto expanded coil spring 65 to retract and pivot the catch 61 back to the position illustrated in FIG. 6 where the catch 61 can intercept and stop the rotation of the pin 60 and the shaft 53. The essentially coincidental deenergization of the feeder motor M1 operates to stop the advancement of cores from the bowl of the feeder 43 to the track 44.

The mechanism 50, FIG. 7, is mounted stationary on base 31 as related hereinabove and extends inwardly to an elevated position above the table 37. This inward portion of the mechanism 50, FIG. 8, detachably mounts the upper vertically inclined section of the tube 27. The tube 27 is also formed with a horizontal section, FIGS. 4 and 7, that extends parallel and adjacent the inner edge of the table 37 a distance slightly greater than the length of the table 37.

Referring to FIG. 4, the left end of the tube 27 is supported and secured to the base 31 by a tube clamping device 90. The device 90 is shown in detail in FIG. 10 as comprising a block 91, which may be formed integral with the base 31, and an adjustable clamping finger 92 controlled by a thumbscrew 93. The block 91 is provided with a step that is grooved at 94 for accommodating a short length of the left end of the tube 27. The thumbscrew 93 bears against the upper surface of the finger 92 and is formed with a threaded end 96 which penetrates the finger 92 and is received by a threaded hole 97 formed in the block 91. A compressed coil spring 98 is received by the threaded end 96 of the thumbscrew 94 and imparts an upward bias to the left end of the finger 92 that spans the groove 94. An adjustable stud 99 is bolted to the right end of the finger 92 and abuts the block 91 maintaining the elevation of this end of the finger 92 to substantially that elevation illustrated in FIG. 10. The thumbscrew 93 may be turned manually clockwise until the finger 92 clamps the left end of the tube 27 securely in the groove 94 and thus to the stationary block 91. The release of this end of the tube 27 by the finger 92 may be effected by turning the thumbscrew 93 counterclockwise as viewed in FIG. 10.

Figure 11:
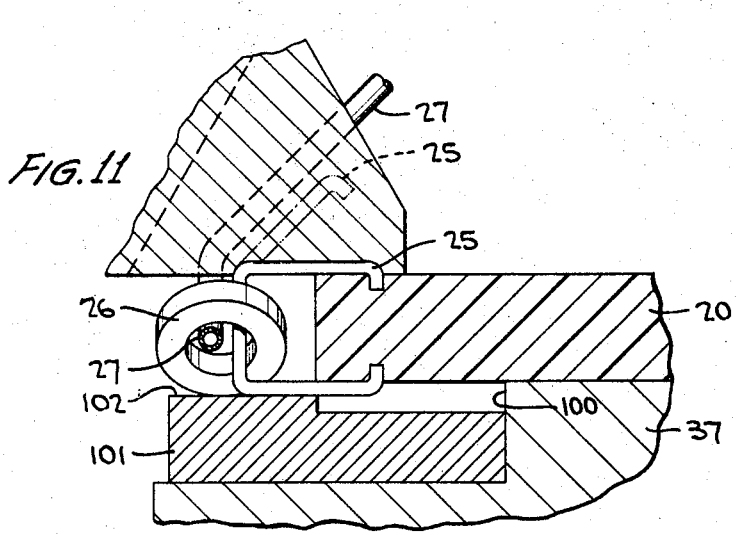
FIG. 11 is an enlarged partial sectional side view of a blade that stakes the upraised end of a core-receiving comb to a solenoid plane.

With reference to FIG. 7, the innermost edge of the table 37 is recessed to receive a strip 101 that is preferably composed of a hardened metal, the ends of the strip 101 being flush with the ends of the table 37. As best seen in FIG. 11, the strip 101 is formed with a horizontal surface 102 which is at a lower elevation than that of the upper surface of the table 37. The difference in elevation between the horizontal plane of the strip surface 102 and the horizontal plane of the upper surface of the table 37 is substantially equal to the diameter of the combs 25. Thus with the solenoid plane 20 clamped to the table 37 by the clips 38, the bottom sections of the combs 25 will be partially supported by the strip surface 102. The bottom side of the table 37, FIG. 7, has a rack 103 of essentially T cross-sectional shape attached thereto. Upper and lower sets of vertically inclined teeth 104 and 105, respectively, are formed on the inner end of the rack 103, the teeth 104 and 105 cooperating to successively advance the rack 103 and the table 37 from right to left, as viewed in FIG. 4.

Figure 9:
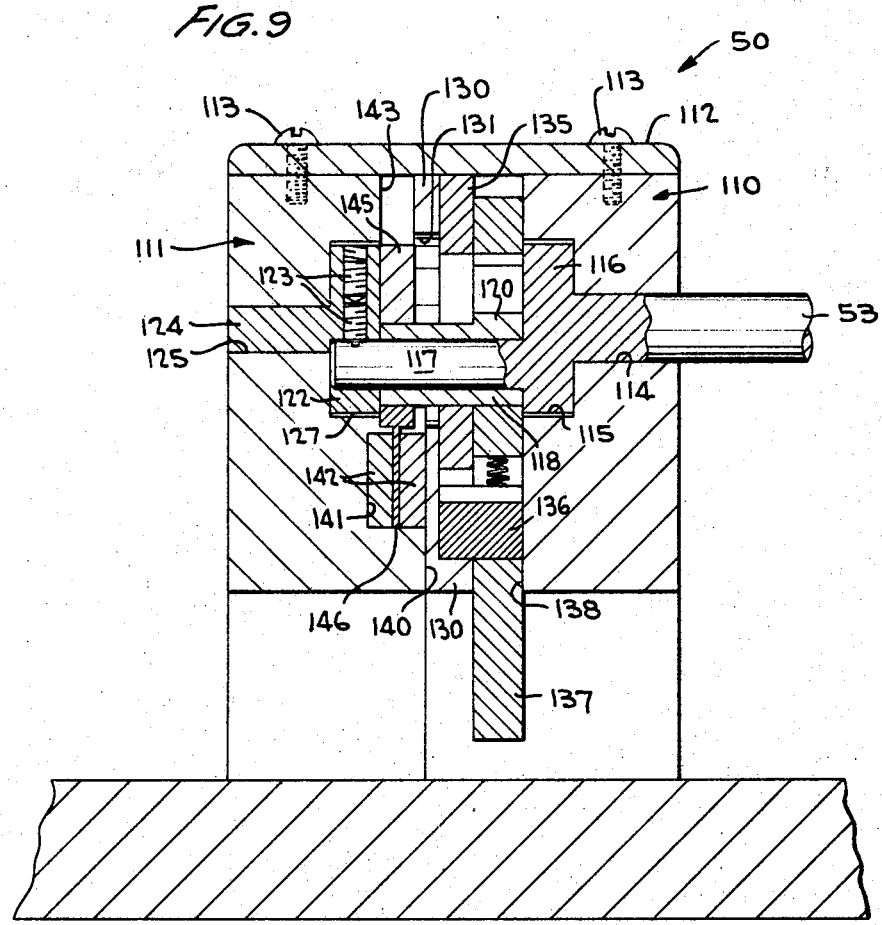
FIG. 9 is a sectional view of the mechanism illustrated by FIG. 7 taken along section line 9—9 in that figure.

The assemblies constituting the mechanism 50, FIG. 9, are at least partially housed in a pair of mutually abutting casings 110 and 111 that are covered by a horizontal plate 112. The plate 112 may be threadedly connected to the casings 110 and 111 by machine screws 113. The casing 110 has a horizontal bore 114 that receives the shaft 53 for rotation, the bore 114 being counterbored at 115 to accommodate a cylindrical collar 116 for rotation therein.

A crank pin 117, which may be formed integral with the collar 116, is positioned eccentric of the axis of rotation of the collar 115 and the shaft 53.

Referring to FIG. 6, the pin 60 is preferably positioned eccentrically on the driven plate 58 so as to be engaged and prevented from rotating by the catch 61 when the crank pin 117, FIG. 13, rotates clockwise, as viewed from the left end of the apparatus 30, to a 45 degree before top dead center position. Therefore, when the solenoid 70, FIG. 23, is deenergized by, for example, opening the limit switch LS, the catch 61, FIG. 6, will engage the pin 60 and stop the crank pin 117 at the 45 degree before top dead center position. The 45 degree before top dead center position, as viewed from the left end of the apparatus 30, is the assumed starting position of the crank pin 117. A cam 118 may be mounted on the crank pin 117 with a loose enough fit to permit relative movement between the crank pin 117 and the cam 118. With the exception of a triangular projection 120, that is formed on the right end of the cam 118, the cam 118 has an overall square cross-sectional shape.

A cylindrical collar 122, FIG. 9, is connected to the left end of the crank pin 117 by set screws 123. The collar 122 is formed integral with a shaft 124 that is mounted for rotation in a bore 125, the bore 125 being counterbored at 127 to the collar 122 for rotation therein. The bores 114 and 125 are preferably coaxial so that the shafts 53 and 124 rotate about a common axis of revolution. The collar 122 supports the left end of the crank pin 117 for eccentric rotation about the axis of rotation of the shafts 53 and 124.

The casing 110 is formed with a vertically disposed spacer plate 130, the plate 130 having a bore 131 that is substantially concentric with the bores 114 and 125. The diameter of the bore 131 is large enough to permit unimpeded rotation of the cam 118 therein. The spacer plate 130 is designed to provide vertical guide surfaces for a vertically oriented core transfer slide 135, a toothed element, a jaw 136, and a table indexing slide 137. The element 136 and the indexing slide 137 are also guided for movement in a vertical plane by a smooth vertical surface 138 of the casing 110.

The casing 111 is designed with a vertical surface 140 which abuts the lower half of the spacer plate 130.

The surface 140 has a horizontal, U-shaped slot 141 and a pair of rectangular comb aligning bars or slides 142 are mounted for sliding movement therein. An upper vertical surface 143 of the casing 111 provides a smooth surface for guiding a vertically oriented comb staking slide 145. The slide 145 includes a relatively thin comb staking blade 146 that is received between the comb aligning bars 142. The comb staking slide 145 and the staking blade 146 are movable in both the horizontal and vertical planes.

The core transfer slide 135, the table indexing slide 137, and the comb staking slide 145, as well as the mechanism associated therewith, cooperate to effect the desired functioning of the mechanism 50. The slides 135, 137, and 145 are at least periodically driven by the rotation of the cam 118. For the purpose of facilitating an understanding of the detailed construction and operation of the mechanism 50, each slide and the mechanism operatively associated therewith will be described hereinafter under separate headings.

*Core transfer assembly*

Figure 14A:
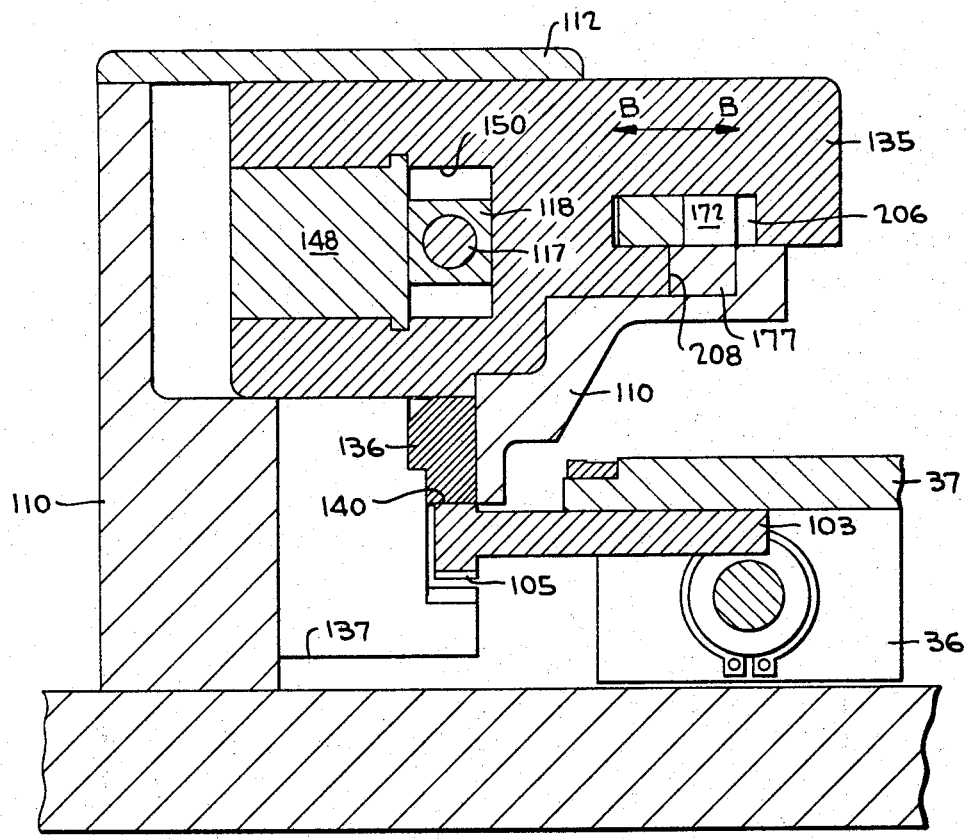
FIGS. 14A and 14B are sectional views taken along section lines 14A—14A and 14B—14B, respectively, of the apparatus illustrated by FIG. 4 and shows two extreme positions of a core transfer assembly that operates to transfer cores to a solenoid plane.
Figure 14B:
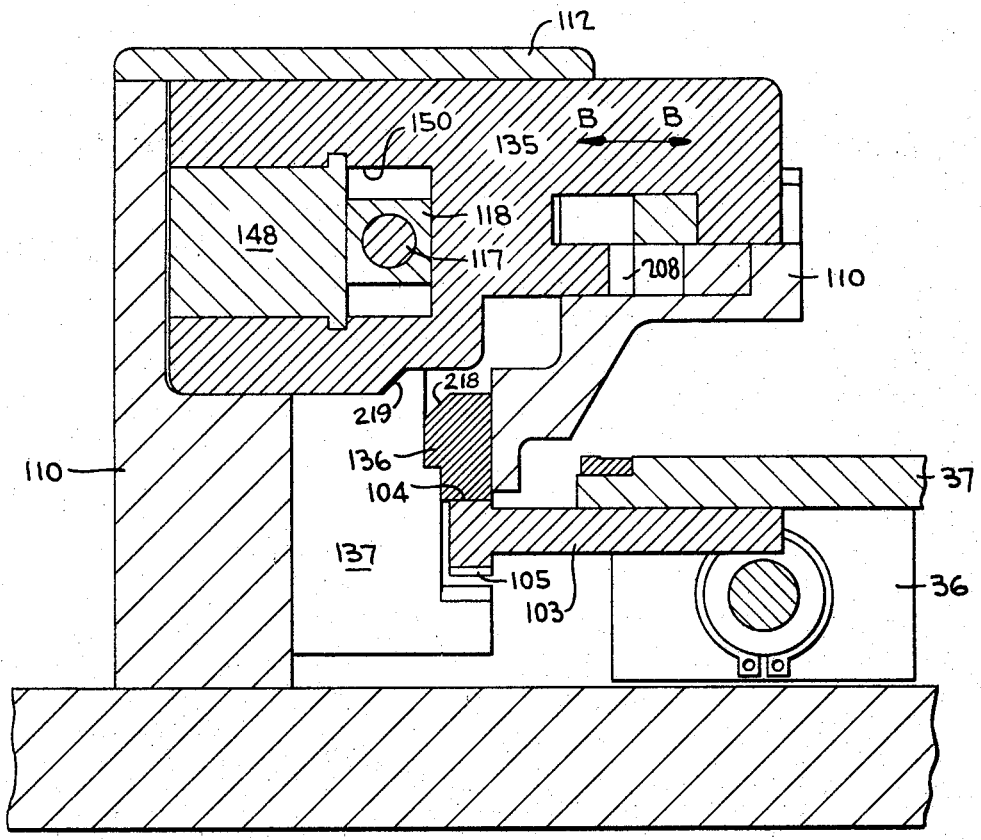

The core transfer assembly includes the core transfer slide 135, FIGS. 14A and 14B, which is constrained by the interior configuration of the casing 110 to movement in the horizontal plane in the directions of arrows B—B. A flat insert 148 of substantially T cross-sectional shape is forced into the slide 135 flush with the outer surfaces thereof. The vertical parallel edges provided by the slide 135 and the innermost end of the insert 148, and the contiguous horizontal edges formed by the slide 135 define a rectangular slot 150. The slot 150 is wide enough to permit vertical movement of the cam 118 relative to the slide 135 and the slot 150 is long enough to accommodate the cam 118 for maximum vertical displacement therein. The slot 150, however, does not permit any appreciable horizontal displacement of the cam 118 relative to the slide 135 and therefore the rotation of the cam 118 imparts only horizontal reciprocation to the slide 135.

Figure 8:
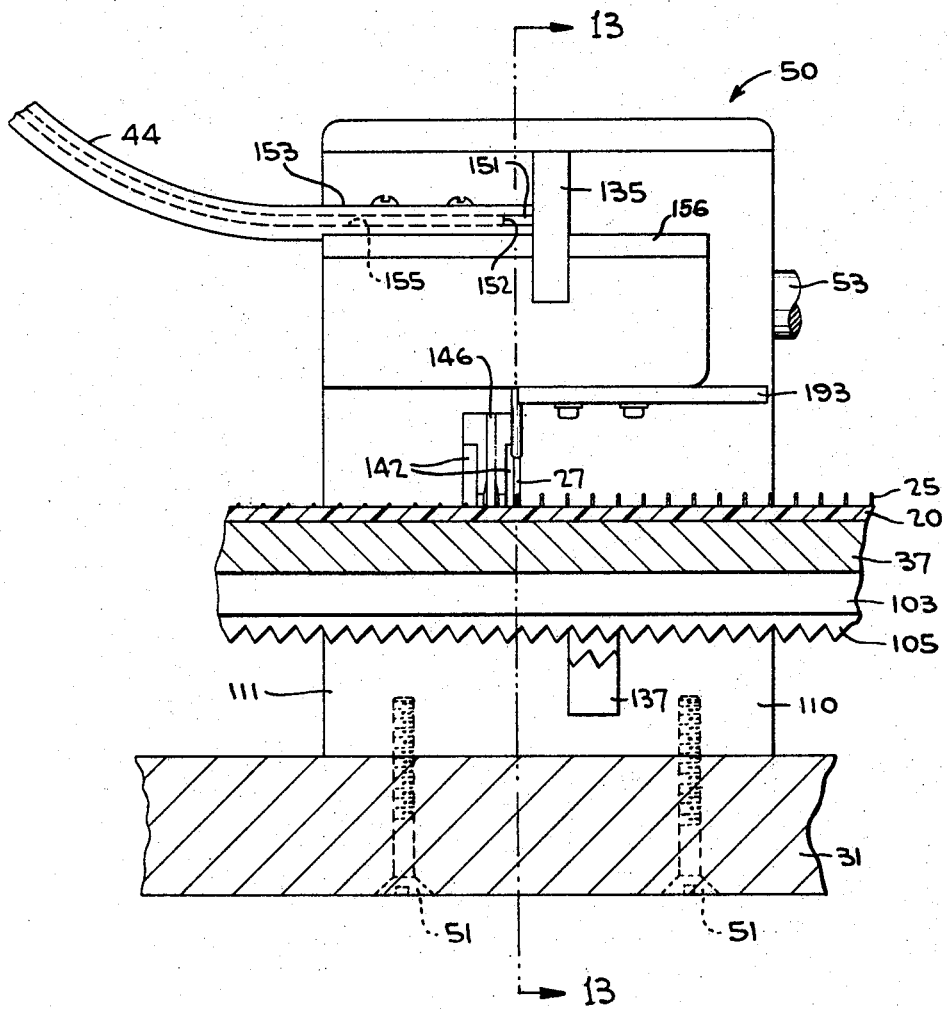
FIG. 8 is a front view of the memory plane fabricating mechanism illustrated in FIG. 7.

The slide 135, FIGS. 8 and 13, has an integral lateral rib 151 which reciprocates with the slide 135, the rib 151 being received in a horizontal rectangular slot 152 formed in a plate 153. The depth of the slot 152 is slightly greater than the depth of the cores that are received by the slot 152. The plate 153 is mounted stationary upon the inwardly projecting portion of the casing 110 and 111 by the machine screws 154. A slot 155 of the same depth as the slot 152, having interior surfaces coplanar with the interior surfaces defining the slot 152, extends through the plate 153 substantially perpendicular to the slot 152. The slot 155 constitutes an enclosed conveyor for core movement from the track 44 to the slot 152.

As may be seen in FIG. 15, a plate 156 is interposed between the plate 153 and the casings 110 and 111, the plate 156 horizontally spanning the upper surfaces of the inwardly projecting portions of the casings 110 and 111. Referring to FIG. 13, a circular core-receiving aperture 157 extends perpendicularly through the plate 156, the aperture 157 being concentric with another circular aperture 158 formed in the plate 153. The upper end of the aperture 158 communicates with one end of the slot 152 and the lower end of the aperture 158 communicates with the aperture 157. The diameters of the apertures 157 and 158 are typically equal and slightly greater than the overall diameter of the largest core that will be received by the core transfer assembly.

Referring to FIGS. 13 and 18A, the rib 151 has a U-shaped core-receiving slot 160 located adjacent the outer end thereof, the slot 160 being dimensioned so that a core is retained loosely in the slot 160 and is therefore readily releasable from the slot 160. Since the slide 135 and the rib 151 reciprocate in the directions of the arrows B—B, FIGS. 19A and 19B, driven by the clockwise rotation of the crank 117, as viewed in these figures, the slot 160 translates from a position laterally opposite the core egress end of the slot 155, FIG. 19A, to a position where the slot 160 is centered above the concentric apertures 157 and 158, FIGS. 13 and 19B. These two extreme positions of the slot 160 correspond to the innermost and outermost limits, respectively, of slide 135 displacement. As will be evident from an examination of FIG. 19B, when the slide 135 translates to its outermost or core-release position, the rib 151 extends to block the core egress end of the slot 155 and prevent the egress of cores from the slot 155.

With reference to FIGS. 13 and 17A, a cylindrical upper end 163 of a tube holder 164 is positioned concentrically in the apertures 157 and 158, the diameter of the end 163 being less than the diameter of the center hole in a core that is received for assembly by the mechanism 50. A core transported by the outermost movement of the slide 135 to a position substantially concentric to a position where the core is substantially concentric with the apertures 157 and 158, FIG. 17A, will fall by gravity from the slot 160 into the aperture 158, encircling the end 163 of the tube holder 164 during the initial stage of its fall.

The tube holder 164 is also formed with upper and lower tube sections 165 and 166, respectively, of square cross-sectional shape, FIGS. 17A and 19A, the sections 165 and 166 having a relatively short cylindrical section 168 interposed therebetween. The section 165, FIGS. 15 and 18A, is periodically clamped between a pair of mating right angle top jaws 170 and 171 formed in a pair of coacting top blocks 172 and 173, respectively. Similarily, the section 166 of the tube holder 164 is periodically clamped between another pair of mating right angle bottom jaws 174 and 175 formed in a pair of coacting bottom blocks 176 and 177, respectively. The opposed right angle surfaces of the jaw pairs 170, 171 and 174, 175 mating with opposite right angle surfaces of the sections 165 and 166, respectively, prevent the tube holder 164 from turning about its longitudinal axis during operation of the core transfer assembly.

The top blocks 172 and 173, FIG. 15, are mounted between the plate 156 and the blocks 176 and 177 for translation toward and away from one another as indicated by the arrows C—C. The bottom blocks 176 and 177 are supported for translation by the casings 110 and 111, respectively, for movement toward and away from one another as indicated by the arrows D—D. A pair of studs 180 and 181 are connected to the blocks 172 and 173, respectively, between the bifurcated ends thereof and serve to further guide the top block pair 172, 173 during their movement. The studs 180 and 181 are received for horizontal sliding movement by the casings 110 and 111, respectively, and a pair of coil springs 182 and 183 are mounted on the studs 180 and 181, respectively. The coil springs 182 and 183 are also located between the bifurcated ends of the top blocks 172 and 173, respectively, and resiliently urge the top blocks 172 and 173 inwardly toward one another. The studs 180 and 181 primarily serve to limit the inward displacement of the top block pair 172, 173 and these studs may be turned by, for instance, a screwdriver so that the heads of the studs will abut the housing 110 and 111, respectively, when desired mutual contact is made between the top block pair 172, 173 and the tube section 165. Similarly, a pair of studs 185 and 186 are threaded into the bottom blocks 176 and 177, respectively, and mount coil springs 187 and 188, respectively, which resiliently urge the block bottom pair 176 and 177 toward one another. The studs 185 and 186 are also slidable in the casings 110 and 111, respectively, and serve as guides for the bottom block pair 176, 177. Further, the studs 185 and 186 may be turned to limit the inward displacement of the bottom block pair 176, 177 so that the desired mutual contact is effected between the bottom block pair 176, 177 and the tube section 166.

The top jaws 170 and 171 are countersunk to form a circular recess 190, and the bottom jaws 174 and 175 are countersunk to form a circular nest 191. With reference to FIG. 17A, with the top blocks 172 and 173 open to accommodate a core that is threaded by the upper end 163 of the tube holder 164, the nest 191 will receive and seat the core 26. The circular recess 190, FIG. 17B, ensures that during intervals when both block pairs 172, 173 and 176, 177 are clamping the tube holder 164 against movement, the core in the nest 191 will not be crushed by the closed jaws 170 and 171. The core is threaded by the cylindrical section 168 when the core is seated in the nest 191. In order to permit the release of a core from the casings 110 and 111, an aperture 192 that is concentric with the longitudinal axis of the tube holder 164 is formed in the casings 110 and 111.

The diameter of the aperture 192 also being slightly larger than the outer diameter of cores received from the nest 191. A slide 193 is mounted to the underside of the inwardly extending portion of the casing 111 by machine screws 194, FIGS. 5 and 17C. Each machine screw 194, FIG. 17C, has a washer 195 which spans an elongated slot 196 formed in the slide 193. The slot 196, FIGS. 17C and 17D, permits limited horizontal displacement of the slide 193, in the directions of arrows E, from a position as illustrated in FIGS. 17A and 17D where the core egress end of the aperture 193 is not blocked by the slide 193, to a position as illustrated in FIG. 17C where the left end of the slide 193 partially blocks the egress end of the aperture 192. When the slide 193 is displaced to the position illustrated in FIG. 17C, a core will be prevented from dropping from the aperture 192 and down the tube holder 164. The slide 193 may be pushed manually to the right, as indicated by the arrow E in FIG. 17D, to release a core that may be in the aperture 192 and to uncover the core egress end of the aperture 192 so that subsequent cores will drop freely through the aperture 192. The slide 193 is positioned to be contacted and driven to the left, as viewed in FIG. 17C, by a stud 197, the stud 197 being mounted on a bracket 198 that is suitably affixed to the inner right end of the table 37 (see FIG. 4). The slide 193 will be driven by the stud 197 to partially block the aperture 192 during the first of the final two indexing movements of the table 37 to the left, as viewed in FIGS. 4 and 5.

For reasons that will become evident subsequently the first of sixty-four cores that is to be threaded onto the first of sixty-four combs is normally retained in the aperture 192, FIG. 17C, by the slide 193. Thus, at the beginning of each typical memory plane assembly operation, the slide 193 of the core transfer assembly is pushed by the operator in the direction of arrow E of FIG. 17D to release the first core from the core transfer assembly to the first comb on the solenoid plane 20. After the sixty-third cycle of operation of the crank pin 117, and during the sixty-fourth indexing cycle of the table 37, FIG. 5, the stud 197 will have indexed with the table 37 to contact and drive the slide 193, FIG. 17C, to block the sixty-fifth core from egressing from the aperture 192. The sixty-fifth core is thus retained in the mechanism 50 as the first core for the next solenoid plane 20.

Figure 12:
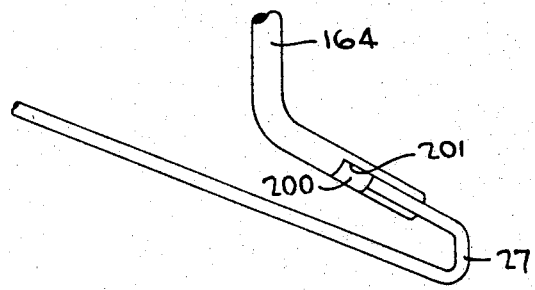
FIG. 12 is a perspective of a portion of a core-threading tube and a tube holder that are constructed in accordance with the principles of the instant invention.

The hollow upper end of the tube 27, FIGS. 2 and 12, is formed with an enlarged eccentric segment 200. The segment 200, as well as a section of the upper end of the tube 27, may be pressed manually into a keyway 201 that is formed in the lower end of the tube holder 164. The curved outer surface of the segment 200 is designed to conform to the periphery of the tube holder 164. The segment 200 provides a detachable connection between the upper end of the tube 27 and the tube holder 164. With the segment 200 pressed into the keyway 201, the outer surface of the segment 200 will be flush with the peripheral surface of the tube holder 164 and the upper end of the tube 27 will be substantially concentric with the longitudinal axis of the lower end of the tube holder 164. Thus, cores that are threaded by the tube holder 164 and drop through the aperture 192 will be also threaded by the tube 27.

As best seen in FIGS. 11 and 19A, the section of the tube 27 between the lower end of the tube holder 164 and the horizontal tube section overlies and conforms to the angled configuration of a typical comb 25 as the comb is connected to the solenoid plane 20 and received by the apparatus 30. Thus, a core that is threaded by the tube section 27 will be initially threaded by the upwardly inclined end of a comb 25 and will be finally threaded by both the vertical portion of the comb 25 and the horizontal section of the tube 27. Each core 26, FIG. 11, is supported partly by the horizontal section of the tube 27 and partly by the shoulder 102 for indexing movement with the solenoid plane 20 from right to left, as viewed in FIG. 19A.

Figure 16:
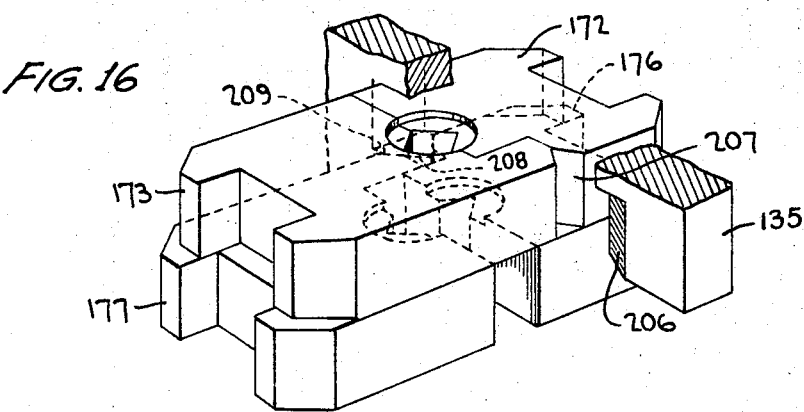
FIG. 16 is a perspective of two jaw pairs and a pair of blades that act in conjunction therewith, and comprise a part of the core transfer assembly of this invention.

In order that successive cores be received and threaded by the tube 27 onto successive combs, the block pairs 172, 173 and 176, 177, respectively, FIGS. 18A and 18B, function to clamp the tube holder 164 stationary in the mechanism 50 without crushing the cores. The slide 135, FIG. 16, includes a pair of blades 206 and 208 that coact to alternately open and close the block pairs 172, 173 and 176, 177, respectively. The abutting corners of the top blocks 172 and 173 are chamfered to provide a V-shaped slot 207 therebetween into which the blade 206 is driven to wedge the top block pair 172, 173 apart, FIG. 18B. Similarly, the opposite abutting corners of the bottom blocks 176 and 177, FIG. 16, are chamfered to form a V-shaped slot 209 therebetween into which the blade 208 is driven to wedge apart the bottom block pair 176, 177. The horizontal separation between the blades 207 and 209 is a function of the width of the top and bottom block pairs 172, 173 and 176, 177, respectively, and also of the width and depth of the slots 206 and 208, respectively. The functional relationship between these elements may be substantially as hereinafter disclosed. The bottom jaws 174 and 175, FIG. 15, are separated by the blade 209 wedging apart the bottom blocks 176 and 177, respectively, during the interval when the crank pin 117 rotates clockwise, from 45 degrees past top dead center, as viewed from the left end of the apparatus 30, through a 90 degree arc to 45 degrees before bottom dead center. The maximum separation of the block pair 176, 177 and the jaw pair 174, 175 will occur when the crank pin 117 rotates clockwise to 90 degrees past top dead center position. During the remaining substantially 270-degree interval of crank pin rotation, the block pair 176, 177 and the jaw pair 174, 175, respectively, close to clamp the tube holder 164 against movement.

The top block pair 172, 173 and the top jaw pair 170, 171, respectively, are separated by the blade 207 entering the slot 206 and wedging open the top block pair 172, 173 during the interval when the crank pin 117 rotates clockwise from 45 degrees past bottom dead center to 45 degrees before top dead center. Maximum separation of the jaws 170 and 171 occurs when the crank pin 117 is at 90 degrees before top dead center. During the remaining substantially 270-degree interval of clockwise crank pin 117 rotation, the jaw pair 170, 171 closes to clamp the tube holder 164 against movement. Thus, during the interval when the crank pin rotates clockwise from 45 degrees before to 45 degrees after top dead center and during the interval when the crank pin 117 rotates clockwise from 45 degrees before to 45 degrees after bottom dead center, the jaw pairs 170, 171 and 174, 175 simultaneously clamp the tube holder 164.

The operation of the core transfer assembly may be described as follows. With the crank pin 117 at the 45 degree before top dead center starting position, the top and bottom jaw pairs 170, 171 and 174, 175, respectively, are closed and clamp the tube holder 164 against movement in any plane. The two jaw pairs 170, 171 and 174, 175 remain closed while the crank pin 117 rotates clockwise, as viewed from the left end of the apparatus 30, from 45 degrees before top dead center to 45 degrees past top dead center. As the crank pin 117 continues to rotate clockwise from 45 degrees past top dead center to 90 degrees past top dead center, the slide 135 is driven to the limit of its inward displacement. During this interval of this crank pin 117 rotation, the blade 208 wedges apart the bottom block pair 176, 177 against the bias offered by the coil springs 187 and 188, FIG. 15. The bottom block pair 176, 177 is fully open when the crank pin 117 is at 90 degrees past top dead center, and if a core is seated in the nest 191, as a result of a previous operation of the core transfer assembly, the full opening of the bottom jaw pair 174 and 175, FIG. 17B, will drop the core into the aperture 192.

With the slide 193 in the position illustrated in FIGS. 17B and 17D, the aperture 192 will be open completely, and the core released from the nest 191 will travel down the tube holder 164 and the vertically inclined section of the tube 27, FIG. 19A. Since a comb will be underlying and closely adjacent the inclined vertical section of the tube 27, the core that is threaded by the tube 27 will be initially threaded by the upwardly inclined free end of a comb 25 and will finally come to rest against the strip 101, threaded by the horizontal section of the tube 27 and by a vertical section of a comb 25. The subsequent indexing of the solenoid plane 20 from right to left, as viewed in FIG. 4, by a mechanism that will be described in detail subsequently, causes the core threaded comb to pull the core along the horizontal section of the tube 27 during indexing. Thus, the core remains threaded by both a comb 25 and the horizontal section of the tube 27.

When the slide 135 is driven to the limit of its inward displacement, FIG. 19A, the rib 151 will be displaced to a position where the slot 160 receives another core from the slot 155. As the crank pin 117 continues to rotate from the 90-degree past top dead center position to 45 degrees before bottom dead center, the blade 208 will be moved out of the slot 209 permitting the hitherto compressed coil springs 187 and 188, FIG. 15, to expand and close the bottom jaw pair 174, 175. A full closure of the bottom jaw pair 174, 175 is effected when the crank pin 117 is at 45 degrees before bottom dead center. During the interval when the crank pin 117 rotates from 45 degrees before to 45 degrees after top dead center, both jaw pairs 170, 171 and 174, 175 clamp the tube holder 164 against movement.

As the crank pin 117 rotates clockwise from 45 degrees past bottom dead center to the 45 degree before top dead center starting position, the blade 207 is driven into the slot 208 to wedge the jaw pair 170, 171 apart, compressing the hitherto expanded coil springs 182 and 183 in the process. Maximum separation between the jaw pair 170, 171 occurs when the crank pin 117 is at 90 degrees past bottom dead center, the jaw pair 174, 175 being fully closed at this period. The return movement of the slide 135, FIG. 19B also causes the rib 151 to transport a core to the tube holder 164. When the crank pin 117 is at 90 degrees past bottom dead center, the slot 160 will be directly over the aperture 153 and the end 163 of the tube 164, and, as related previously, the jaw pair 170, 171 will be fully open to receive this core. The core transported by the return movement of the rib 151, FIG. 17A, threads the core holder 164 as it falls by gravity through the open jaws 170 and 171 and seats in the nest 191 formed by the now closed bottom block pair 176, 177. The crank pin 117 continues to rotate clockwise to the 45 degree before top dead center starting position, thereby completing one cycle of operation of the core transfer assembly.

It should be apparent that in accordance with principles of this invention, the slide 135 performs the dual functions of transporting successive cores to positions for threading the tube 27 and of operating the jaw pairs so they alternately clamp the tube 27 against movement in any plane while the tube 27 threads the cores. For reasons that will be evident subsequently, the slide 135 also operates in conjunction with the jaw 136 to index the table 37 once during each cycle of the mechanism 50.

*Table indexing assembly*

The table indexing assembly, FIG. 20A, includes the jaw 136, the key-shaped table indexing slide 137 and, FIG. 14B, the core transfer slide 135. The jaw 136, FIG. 20A, and the slide 137 are mounted in the casing 111 for movement in the vertical plane, as indicated by the arrows F—F.

Referring to FIG. 20A, the jaw 136 rests upon a shoulder 216 formed on the slide 137 and upon upward vertical movement of the slide 137, the shoulder 216 bears against and raises the jaw 136 vertically upward. A coil spring 217 having a lower end housed by the jaw 136, and the upper end abutting the slide 137 resiliently urges the jaw 136 into contact with the shoulder 216. The jaw 136 has a camming surface 218 inclined at typically 45 degrees to the vertical, and the slide 135, FIG. 14B, has a corresponding inclined camming edge 219 that is designed to engage and cam the surface 218 downward upon movement of the slide 135 inwardly, or to the right as viewed in FIG. 14B. The initial contact between the camming edge 219 of the slide 135 and the camming surface 218 of the jaw 136 occurs when the crank pin 117 is rotated clockwise, FIG. 14A, from a starting position at 45 degrees before top dead center, to top dead center. The further rotation of the crank pin 117 from the top dead center position to a position 45 degrees past top dead center, drives the jaw 136 through the camming edge 219 of the slide 135 to the limit of its downward displacement. It may be recalled that during this interval of crank pin 117 rotation, the jaw pairs 170, 171 and 174, 175 simultaneously clamp the tube holder 164 against movement. Further, it may be recalled that the jaw pair 170, 171 is fully open when the crank pin 117 is at 90 degrees before top dead center and that the jaw pair 174, 175 are fully open when the crank pin 117 is at 90 degrees after top dead center. Thus, the downward displacement of the jaw 136 caused by operation of the slide 135 occurs after the jaw pair 170, 171 has opened and closed and before the jaw pair 174, 175 has fully opened.

Referring to FIGS. 21A and 21B, the table indexing slide 137 incorporates a pair of upwardly projecting teeth 220 having saw tooth profiles and the jaw 136 incorporates a plurality of downwardly projecting teeth 221 having substantially identical profiles. As will be evident from an examination of FIGS. 21A and 21B, the apices of the saw teeth 104 and 105 are not in the same vertical plane; the apices of the teeth 104 and 105 leading the apices of the teeth 105 by typically .08 inch. The leading edges of the teeth 220 are inclined upwardly to the right, as viewed in FIG. 21A, and the leading edges of the teeth 221 are inclined upwardly to the left as viewed in that figure. The teeth 220 are formed on the slide 137 such that the apices of the saw teeth 220 are displaced a predetermined distance to the left of the apices of the saw teeth 105 when the teeth 221 of the jaw 136 mesh completely with the teeth 104, FIG. 21A. Conversely, the teeth 221 are formed on the jaw 136 such that the apices of the teeth 221 are displaced an equal predetermined distance to the right of the apices of the teeth 104 when the teeth 220 mesh completely with the teeth 105, FIG. 21B. Thus, the respective upward and downward movement of the slide 137 and the jaw 136 will incrementally advance the rack 104 twice to the left, or in the direction of arrow G to a total distance that is substantially equal to the lateral center-to-center distances between adjacent combs 25. Typically, the two increments of rack 103 advancement in the direction of arrow G are equal, each increment advancing the rack 103 substantially .08 inch since, as related hereinabove, the lateral center-to-center distance between adjacent combs is typically .160 inch. Obviously, if the lateral center-to-center distance between adjacent combs is lesser or greater than .160 inch, the increments of rack 103 advancement must be correspondingly lesser or greater than .08 inch.

With the teeth 220, FIG. 21A, out of engagement with the teeth 105, the leftward inclination of the trailing edges of the teeth 104 and the leftward inclination of the leading edges of the teeth 221 which are in mutual contact permit the teeth 221 to ride up and over the apices of the teeth 104 when the operator shifts the rack 103 to the right, as viewed in FIG. 21A. As will be evident subsequently, the operator shifts the rack 103 to the right to initiate an assembly operation. The coil spring 217, FIG. 20A, dampens the vertical oscillations of the jaw 136 generated when the rack 103 is shifted rapidly to the right.

The vertical displacement of the slide 137, FIG. 20B, is controlled by the projection 120 formed on the block 118. The projection 120 rotates with the crank pin 117 in a square opening 224 formed in the upper end of the slide 137. A tooth 225 formed integral with the slide 137, projects into the opening 224 with the apex thereof in vertical alignment with the top dead center position of the crank pin 117. The tooth 225 has a triangular cross-sectional shape similar to that of the projection 120. As may be seen in FIG. 20B, the tooth 225 is engaged by the projection 120 when the projection 120 rotates from approximately an eleven o'clock position to a top dead center position. During this interval of crank pin 117 rotation, the projection 120 will cam against and drive the tooth 225 upward, thereby driving the jaw 136, FIG. 14B, and slide 137, FIG. 21B, upward. The upward displacement of the jaw 136 causes a disengagement between the teeth 221 and 104 and frees the rack 103 for indexing. The upward displacement of the slide 137 causes a subsequent engagement between the teeth 220 and 105 so that the rack 103 and the table 37, FIG. 8, are indexed to the left a first increment of typically .08 inch. As soon as crank pin 117 passes the top dead center position, the projection 120 will ride off the apex of the tooth 225 and release the slide 137 for controlled downward movement.

The initial downward displacement of the slide 137, FIG. 21A, will drive the teeth 220 from engagement with the teeth 105. The opening 224 in the slide 137 is preferably dimensioned so that the vertical displacement of the slide 137 is synchronized with the horizontal displacement of the slide 135 such that when the projection 120 rides off the apex of the tooth, the camming edge 219 of the slide 135 initially contacts the caming surface 218 of the jaw 136. The continuing downward movement of the slide 137 under the control of the projection 120 is synchronized to coincide with an equal downward displacement of the jaw 136 effected by the slide 135 acting against the jaws 136 and the shoulder 216 through the caming edge 219. The jaw 136 will be driven by the slide 135 to the limit of its downward displacement when the crank pin 117 reaches the 45 degrees past top dead center position and the slide 135 will continue to advance inwardly, as mentioned hereinabove, as the crank pin 117 rotates to the 90-degree after top dead position, FIG. 14A.

The downward displacement of the jaw 136 that is effected by the inward movement of the slide 135 will drive the teeth 221, FIG. 21A, down and into engagement with the teeth 104 to effect a second incremental indexing of the rack 103. With the crank pin 117 at the 45 degree past top dead center position, the teeth 104 and 221 will fully mesh and the table 37 will thereupon be indexed another increment of typically .08 inch. The further rotation of the crank pin 117 from the 90-degree past top dead center position to the 45 degree before top dead center starting position, illustrated in FIG. 20A, conditions the table indexing assembly for the next indexing operation. Thus, each complete rotation of the crank pin 117 will index the rack 103 and the table 37 twice to the left, as viewed in FIGS. 4 and 8, a total distance of typically .160 inch; thereby presenting the upraised core-carrying combs to a comb staking assembly.

Core staking assembly

The core staking assembly, FIG. 22A, includes the comb staking slide 145, the comb staking blade 146 and the comb positioning slide 142, FIGS. 8 and 22A.

The comb staking slide 145 receives a slide insert 230 of substantially T cross-sectional shape, the insert 230 being preferably force-fitted into the slide 145 flush with the opposite faces thereof. The lower horizontal surface of the insert 230 defines the upper horizontal edge of a rectangular opening 231 formed in the slide 145. The cam 118 is slidable in the opening 231, the length of the opening 231 being at least as great as the maximum horizontal displacement of the block 118.

The casing 111 is formed with a pair of parallel surfaces 232 that are inclined upward to the left, as viewed in FIG. 22A, at typically 30 degrees to the vertical. The surfaces 232 receive and guide the slide 145 for reciprocative movement in the directions of the arrows H—H, toward and away from the strip 101. A pair of bars 233 are affixed by pins 235 to opposite faces of the blade 146 adjacent the outer end of the blade 146, and although only one bar 233 is shown in FIG. 22A, it will be understood that the other bar forming the pair is substantially of the same size and shape, and is affixed in the same relative position to the blade 146 as the single illustrated bar 233. The pair of bars 233 are received individually for sliding movement in a pair of rectangular grooves 234 that are individually formed in the faces of the horizontally positioned slides 142 that are adjacent opposite sides of the blade 146. Again, only one of the two grooves are shown by the drawings. The grooves 234 are inclined upward to the right, as viewed in FIG. 22A, at typically 30 degrees to the vertical. Thus, movement of the slide 145 in the directions of the arrows H—H is transmitted by the bars 233 to the grooves 234 and hence to the slides 142 causing movement of the slides 142 in the horizontal plane in the directions indicated by the arrows J—J. The thickness of the blade 146 is substantially equal to the diameter of a typical comb 25 and the lateral distance between the slides 142 is slightly greater than a typical comb diameter. The lower edges of the slides 142 are in a horizontal plane that is elevated slightly above the upper planar surface of the solenoid plane 20 so that the lower edges of the slides 142 are in a horizontal plane that is elevated slightly above the upper planar surface of the solenoid plane 20 so that the lower edges of the slides 142 can be displaced inwardly of the solenoid plane 20 without contacting any part of the plane except the upraised ends of the combs 25.

The downward and upward reciprocative movement of the slide 145 is produced by the rotation of the crank pin 117, clockwise, as viewed from the left end of the apparatus 30. The clockwise rotation of the crank pin 117 from a 45-degree before top dead center position, FIG. 22A, to a bottom dead center position, FIG. 22B, will drive the blade 146 initially upward and then downward at the desired inclination to the vertical, FIG. 11, to stake the downwardly extending tip of the upraised end of a comb 25 to the solenoid plane 20. The downwardly extending tip that is inserted into the top groove 24 of the solenoid plane 20 penetrates the top end of a solenoid loop 21. Coincident with the initial downward movement of the slide 145, the comb orienting slides 142 are driven inwardly, FIG. 22B, to position therebetween the upraised end of the comb 25 that is to be staked by the blade 146; the slides 142 thereby ensuring that the upraised end of the comb 25 is vertically oriented prior to and during the period when the blade 146 stakes the comb 25 to the solenoid plane 20.

Upon continued clockwise rotation of the crank pin 117 from the bottom dead center position to the 45 degrees before top dead center position, the slide 145 is moved upward to a position for initiating another staking cycle. The slides 142 are driven outward by the upward movement of the slide 145 so as not to interfere with the subsequent indexing of succeeding unstaked combs on the solenoid plane 20.

Referring to FIG. 8, the vertical section of the tube 27 is located in the mechanism 50 to the right of the blade 146 and the slides 142. The horizontal distance between the center of the vertical section of the tube 27 and the center of the blade 146 is preferably equal to the distance the rack 103 and the table 37 fully index during one cycle of operation of the table indexing assembly, disclosed hereinabove. It may be recalled that the indexing of the table 37 occurred in two equal increments during the clockwise rotation of the crank pin from the 45-degree before top dead center position to 45 degrees past top dead center position, and that each increment was related as being typically equal to .08 inch. Thus, the horizontal distance between the center of the vertical section of the tube 27 and the center of the blade 136 is typically .160 inch, which is also related hereinabove, is the lateral center-to-center distance between adjacent combs 25 on the solenoid plane 20.

The operation of the comb staking assembly is described as follows. As the crank pin 117, FIG. 22A, rotates clockwise from the 45-degree before top dead center starting position to a position 45 degrees past top dead center a core-carrying comb, FIG. 8, having an upraised free end is indexed by operation of the aforedisclosed table indexing assembly from a position where the unstaked comb underlies the tube 27 to a position directly beneath the staking blade 146.

As the crank pin 117 continues to rotate clockwise from the top dead center position to the bottom dead center position, FIG. 22B, the slide 145 and the blade 146 are driven downward and the slides 142 are driven inward. The slides 142 move inward above the solenoid plane 20 far enough to receive and vertically orient therebetween the upraised end of the unstaked core-threaded comb. After the slides vertically position the core-threaded comb, the further downward movement of the blade 146, FIG. 11, forces the downwardly extending tip of the hitherto upwardly raised end of the comb into the top groove 24 of the solenoid plane 20. The downwardly extending tip penetrates the top end of the same solenoid loop 21 to which the bottom end of the comb has initially connected.

The continued clockwise rotation of the crank pin 117 from the bottom dead center position to the 45-degree before top dead center starting position drives the slide 145 and blade 146 upward. The upward movement of the blade 146 drives the slides 142 far enough outward from the solenoid plane 20 to permit the succeeding indexing of another unstaked comb to a position directly beneath the blade 146.

Description of overall apparatus operation

Assuming that the switch 81, FIG. 23, is initially open, the solenoid 70 will be in a deenergized state and the catch 61, FIG. 6, will be engaging the pin 60. With the catch 61 in engagement with the pin 60, the crank pin 117, FIG. 20A, will be at the 45-degree before top dead center starting position and the jaw 136 and the table indexing slide 137 will be substantially in those respective positions as illustrated by FIG. 21A.

The table 37, FIG. 4, may then be shifted manually to the right, as viewed in FIG. 4, until the right end of the table 37 abuts the block 33 that is adjacent the right end of the apparatus. The tube 27 may or may not be attached initially to the apparatus. If the tube 27 is not initially attached to the apparatus, the operator may take the tube and press the segment 200, FIG. 12, and the uppermost end of the tube 27 that is integral therewith into the keyway 201. With the right end of the tube 27 thus secured, the operator can insert the left end of the tube 27 into the groove 94 of the clamping device 90, FIG. 10, under the finger 92, and then tighten the thumbscrew 93 to fix the left end of the tube 27 stationary to the apparatus 30.

With the table 37 at the extreme right end of the apparatus, as viewed in FIG. 4, a solenoid plane 20, such as illustrated in FIG. 1 may then be centered on the table 37 and the clips 38 inserted over the ends of the solenoid plane 20 and the table 37. With the solenoid plane 20 thus clamped to the table 37, the first or leftmost comb 25 will be located directly under and in vertical alignment with the vertical section of the tube 27, FIG. 8. Normally, due to the previous operation of the apparatus 30, one core will be in the aperture 192, being retained therein by the slide 193, and a second core will be seated in the nest 191 that is formed by the now-closed lower jaw pair 174, 175. If no core is retained in the aperture 192, the operator may loosen the finger 92 of the device 90, FIG. 10, and detach the upper end of the tube 27 and the segment 200 from the keyway 201, FIG. 12. With the segment 200 detached from the keyway 201, the operator may then manually thread the first core onto the segment 200 and guide this core onto the first comb 25 of the solenoid plane 20. The tube 27 may then be reconnected to the mechanism 50 in the manner related hereinabove. Alternatively, and for reasons that will be evident subsequently, the mechanism 50 may be operated once, twice or a greater number of times, with the solenoid plane 20 removed from the table 37 until one core is dropped by the nest 191 and a second core is dropped into the aperture 192 and retained therein by the slide 193.

As mentioned hereinabove, by reason of the previous operation of the mechanism 50, the first core will be normally retained in the aperture 192 by the slide 193, FIG. 19D, and thus the operator need only push the slide 193 to the right, as viewed in FIG. 17D, to release the first core, FIG. 19A, to thread the first comb, and the horizontal section of the tube 27. With the crank pin 117 at the 45-degree before top dead center starting position, FIG. 14A, the top jaw pair 170, 171 will be either almost fully or fully closed and the bottom jaw pair 174, 175 will be fully closed thereby clamping the tube holder 164 against movement while forming the nest 191 that receives and seats the second core, FIG. 17D. The second core is also normally in the nest 191 as a result of a previous operation of the mechanism 50.

The operator then closes the switch 81, FIG. 23, which effects the energization of the drive motor M2. The motor M2, FIG. 4, rotates the drive plate 57 of the clutch 54, but the driven plate 58 is held against the rotation by the catch 61 engaging the pin 60 of the plate 58. The operator then pushes the pushbutton start switch 83, FIG. 23, which momentarily closes to energize the control relay CR. The control relay CR operates when energized to close the contacts KCR and KCR1. The closure of the contacts KCR operates to lock the control relay CR and the solenoid 70 in the energized state. The closure of the contacts KCR1 operates to energize the motor M1 which vibrates the core feeder 43, FIG. 4, so that cores are fed to the track 44, FIG. 8, and advanced from the track 44 to the slot 155.

When the solenoid 70 is energized by the closure of the contacts KCR, FIG. 23, the catch 61, FIG. 6, is pulled in to release the pin 60 and the driven plate 58 for rotation. The rotation of the drive plate 57 imparts rotation to the plate 58 which drives the crank pin 117 by way of the drive shaft 53 from the 45 degrees before top dead center starting position.

The initial clockwise angular displacement of the crank pin 117 from the 45-degree before top dead center starting position drives the projection 120, FIG. 20B, against the tooth 225 camming the slide 137 upward. The initial upward movement of the slide 137 pulls the jaw 136 upward to effect a disengagement between the teeth 221 and the teeth 104 of the rack 103, thereby releasing the rack 103 for subsequent indexing. During the final upward movement of the slide 137, the teeth 220, FIG. 21B, of the slide 137 engage and fully mesh with the teeth 105 of the rack 103 to effect the first incremental indexing of the table 37 from right to left, as viewed in FIG. 4.

The clockwise angular displacement of the crank pin 117 from the starting position to the top dead center position, will drive the slide 135, FIG. 18A, to the right, as viewed in FIG. 18A, and the blade 206 from contact with the top block pair 172, 173. Therefore during this interval of crank pin 117 rotation, the top jaw pair 170, 171 and the bottom jaw pair 174, 175 simultaneously clamp the upper end of the tube holder 164 against movement in any direction.

The continued clockwise rotation of the crank pin 117, FIG. 20B, off top dead center will suddenly release the slide 137 for downward movement, the slide 137 being driven downward by the inwardly moving camming edge 219, FIG. 14B, of the slide 135 camming against the jaw 136. During the initial downward movement of the slide 137, the teeth 220, FIG. 21A, of the slide 137 disengage from the teeth 105 of the rack 103 releasing the rack 103 for subsequent indexing by the downwardly driven teeth 221 of the jaw 136. After the teeth 220 and 105 disengage, the teeth 221 of the jaw 136 are driven into complete engagement with the teeth 104 of the rack 103, and the rack 103 and the table 37 are indexed a second increment from right to left, as viewed in FIG. 4. The first core 26, FIG. 11, is pulled by the first comb 25 during the indexing thereof and slides upon the horizontal section of the tube 27 and the strip 101.

The teeth 221 of the jaw 136, FIG. 29A, rest upon the trailing edges of the teeth 104 of the rack 103 and serve to hold the rack 103 against movement during the continued clockwise rotation of the crank pin 117 from 45 degrees past top dead center to the 45-degree before top dead center starting position.

Figure 10:
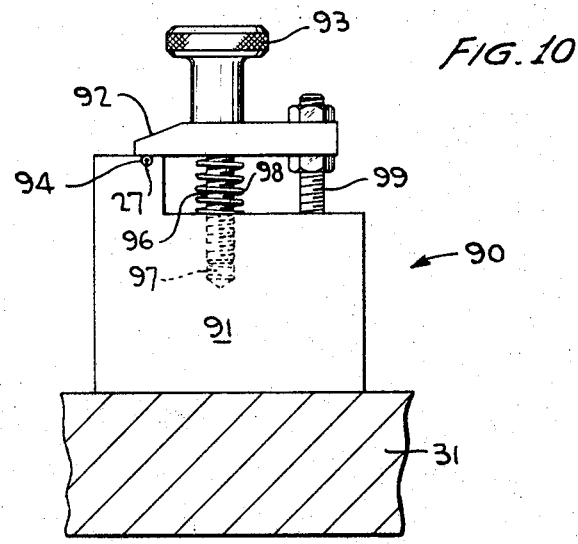
FIG. 10 is an enlarged front view of a tube clamping device that is utilized in accordance with the principles of this invention.

The two incremental indexings of the rack 103 will move the first comb 25 and the first core 26 threaded by the horizontal section of the tube 27 to a position directly beneath the staking blade 146, FIG. 10, and will index the second comb 25 to a position underlying the vertical section of the tube 27, and previously occupied by the first comb 25. The clockwise rotation of the crank pin 117, FIG. 22A, from top dead center to 45 degrees past top dead center will initiate the downward movement of the staking blade 146 and the coincident inward movement of the slide pair 142, but the slide pair 142 will not move far enough inward during this interval of crank pin rotation to interfere with the indexing of the combs.

As the crank pin 117 continues to rotate clockwise from 45 degrees past top dead center, the slide 135, FIG. 14B, is driven toward the limit of its inward displacement and the blade 208 proceeds to drive the bottom block pair 176, 177 apart. When the crank pin 117 rotates 90 degrees past top dead center the bottom jaw pair 174, 175 open fully. The second core that was hitherto seated in the nest 191 is then released by the jaw pair 174, 175 and drops by gravity to thread the second comb 25 that is now in a position underlying the vertical section of the tube 27. The second core 26 is threaded by the horizontal section of the tube in the same manner as the first core. In addition, when the crank pin 117 is at 90 degrees past top dead center, rib 151, FIG. 19A, moves to a position where the slot 160 picks up a third core from the slot 155. Further, when the crank pin 117 is at 90 degrees past top dead center, FIG. 22A, the slides 142 will be moved inwardly to vertically orient the first core-carrying comb 25 on the solenoid plane 20 and the blade 146 will contact the upwardly inclined end of the first comb 25.

Upon continued clockwise rotation of the crank pin 117 from 90 degrees past top dead center to bottom dead center, FIG. 22B, the blade 146 will be driven downward to stake the downwardly projecting top of the hitherto upraised free end of the first comb 25 into the top groove 24 of the solenoid plane 20, the downwardly extending tip penetrating the top end of the first solenoid loop 21 and the top insulated tape 22. As the crank pin 117 rotates beyond the 90-degree past top dead center position, the slide 135, FIG. 18A, will also begin its return movement causing the blade 208 to move out of the slot 209 and initiate the closure of the bottom jaw pair 174, 175. When the crank pin 117 rotates to bottom dead center, the bottom jaws 174 and 175 will close sufficiently to clamp the tube holder 164 against movement.

The continued clockwise rotation of the crank pin 117 from bottom dead center to 45 degrees past bottom dead center drives the slide 135, FIG. 18B, to the limit of its outward displacement and the blade 207 enters the slot 209 to wedge apart the top jaw pair 170, 171. The jaw pair 170, 171 is wedged fully open when the crank pin 117 rotates to 90 degrees past bottom center.

The complete opening of the pairs 170 and 171 coincides with the outwardmost movement of the ribs 151, FIG. 19B, so that the third core is transported by the rib 151 to a position for threading the uppermost end 163 of the tube holder 164. The third core, threaded by the tube holder 164, falls by gravity through the fully open top jaw pair 170, 171 and comes to rest in the nest 191 formed by the now-closed bottom jaw pairs 174, 175.

The comb staking blade 146, FIG. 22B, having now staked the first comb 25 to the solenoid plane 20 begins return movement toward its initial upward position, driving the slides 142 outward from the solenoid plane 20 or to the left, as viewed in FIG. 22B. The outward movement of the slide 135, FIG. 14B, now completely unblocks the jaw 136 for return upward movement with the slide 137. The continued clockwise rotation of the crank pin 117 from 90 degrees before top dead center to the 45-degree before top dead center starting position further conditions the mechanism 50 for the next assembly cycle.

After the crank pin 117 has rotated sixty-three complete revolutions, and by virtue of the fact that the operator initially released the first core to the first comb by manually operating the slide 193, FIG. 17D, each of the sixty-four combs will now be threaded with a single core.

During the sixty-fourth revolution of the crank pin 117, the table indexing assembly will have indexed the stud 197 against the slide 193, FIGS. 4 and 17C, driving the slide 193 to block the release of the sixty-fifth core from the mechanism 50 to the solenoid plane 20. The release of the sixty-fifth core into the aperture 192 is effected by the opening of the bottom jaw pair 174, 175 when the crank pin 117 is at 90 degrees after top dead center during its sixty-fourth revolution. The sixty-fifth core that is received by the aperture 192 will become the first core for the next solenoid plane 20 mounted on the table 37. As the crank pin rotates to 90 degrees after bottom dead center during its sixty-fourth revolution, the sixty-sixth core will be dropped into the nest 191 by the return movement of the rib 151, FIG. 19B. The sixty-sixth core seats in the nest 191 formed by the now-closed bottom jaw pair 174, 175 and becomes the second core for the aforementioned next solenoid plane 20.

Thus, at the beginning of every assembly operation, the first core will be in the aperture 192 and the second core in the nest 191. If, for any reason, this is not the case, the solenoid plane 20 may be removed from the table 37, and the slide 193 displaced to block the aperture 192. The switch 81 may then be closed for a short period sufficient to cause the mechanism 50 to operate twice. The solenoid plane 20 may subsequently be remounted on the table 37, the slide 193 operated, and the switch 81 reclosed to initiate the first automatic cycle of operation of the mechanism 50.

During the sixty-fourth indexing of the table 37, FIG. 5, the left bearing block 36 will move with the table 37 to contact and depress the actuator arm 82 of the limit switch LS. When the arm 82 is depressed, the limit switch LS opens, FIG. 23, to effect the deenergization of the control relay CR and the solenoid 70, the relay CR then operating to reopen the contacts KCR and KCR1.

When the solenoid 70 is deenergized, the catch 61, FIG. 6, is released and is pulled inward by the hitherto expanded coil spring 65 to intercept the rotating pin 60. The drive motor M2 continues to rotate the plate 58 until the pin is at 45 degrees before top dead center, whereupon the catch 61 engages the pin 60 to stop and preclude the further rotation of the shaft 53 and the crank pin 117. The reopening of the contacts KCR1 effects the deenergization of the feed motor M1 which stops supplying cores to the track 44, FIG. 5.

The tube 27 may then be removed from the clamping device 90, FIG. 10, and from the tube holder 164, FIG. 12, by the operator, and the clips 38, FIG. 5, withdrawn to permit the removal from the table 37 of the solenoid plane 20 together with the tube 27 that is now commonly threaded through all sixty-four cores. The tube 27 may then be threaded with the bias wire BW and the X-selection wire X, the operator normally initially threading the open end of the tube that is integral with the segment 200. The ends of the bias wire BW and the X-selection wire X that egress from the open end of the horizontal section of the tube 27 may be gripped by the operator, and the tube 27 pulled to the left, as viewed in FIG. 2, from the cores 26 and the bias and X-selection wires, leaving both wires threaded through all sixty-four cores, as illustrated by FIG. 3. The sixty-four cores may then be manually threaded by individual Y-selection wires Y1, Y2 . . . YN to finish the assembly of the memory plane.

It is to be understood that the above-described embodiments of the invention are merely illustrative and that numerous modifications may be made of the embodiments within the spirit and scope of the invention. For example, the tube 27, FIG. 2, may be threaded by the core winding wires prior to its connection with the apparatus 30; or the tube 27 may be modified by forming an opening at the intersection between the horizontal and the vertically inclined sections of the tube 27, the opening being substantially concentric with the longitudinal axis of the horizontal tube section. With the horizontal section of the tube 27 now open at both ends, a straight, wire-threaded needle might be inserted through the horizontal section of the tube 27 to facilitate the threading of the tube with the core winding wires. Another possible modification which is contemplated as falling within the spirit and scope of this invention involves forming the left end of the tube 27, FIGS. 4 and 12, as a hook or eye that may be threaded by the core winding wires so that the wires would be pulled through the cores by the tube as the tube is withdrawn from the cores.

What is claimed is:
1. An assembling apparatus comprising:
    a table movable in at least one direction and mounting an article having at least one element threading member, the element being cored with a hole of predetermined diameter;
    a tube having a diameter smaller than the diameter of the hole in the cored element for threading the hole in the cored element, said tube including:
        a first tube section connected to the apparatus and a second tube section connected to the first tube section for receiving and threading cored elements that are threaded by said first tube section, said second tube section extending in said one direction with the longitudinal axis thereof substantially parallel and adjacent the path of movement of the member;
    means for threading said first tube section with the cored element that is received by the threading means from a supply of cored elements;
    means coupled to the threading means for indexing said table in said one direction a predetermined distance such that the member is in a position to thread the element threaded by the first and second tube sections, the member and said second tube section threading the cored element during further movement of said table in said one direction by operation of the indexing means.

2. The apparatus as claimed in claim 1, wherein the angle formed at the connection between said first and second tube sections is substantially a right angle.

3. The apparatus as claimed in claim 1, wherein the portion of said second tube section that threads the cored element has a longitudinal passage for facilitating the further threading of the cored element.

4. The apparatus as claimed in claim 1, wherein said table detachably mounts the article and said tube is detachably connected to the apparatus and removable from the apparatus with the article.

5. An assembling apparatus comprising:
   a table for detachably mounting an article incorporating at least one element-threading member, the element being cored with a hole of predetermined diameter;
   means mounting said table for movement in one plane in at least one direction;
   a tube having an outer diameter substantially smaller than the diameter of the hole in the cored element for threading the hole in the cored element, said tube including:
      a first tube section connected to the apparatus and a second tube section connected to the first tube section for threading cored elements that are threaded by said first tube section, said second tube section extending in said one direction with the longitudinal axis thereof substantially parallel and adjacent the path of movement of the member;
   means in said second tube section for facilitating a further threading of the element with a filament;
   means for transporting the cored element from a supply of cored elements to a position where the hole in the cored element is centered over said first tube section;
   means coupled to the element transporting means for indexing said table in said one direction to an element-threading position where the member is in a position to thread the hole in the cored element that is centered over said first tube section; and
   element release means interposed between said element transporting means and said first tube section, said element release means being coupled to said indexing means for operating after the member is indexed to the element-threading position to release the centered cored element to said first tube section for subsequent simultaneous threading by the member and said second tube section.

6. An assembling apparatus comprising:
   a table for detachably mounting an article incorporating at least one element-threading member, the element being cored with a hole of predetermined diameter and the member having a hole-threading end;
   means mounting said table for movement in one plane in at least one direction;
   a tube having an outer diameter substantially smaller than the diameter of the hole in the cored element for threading the hole in the cored element, said tube including:
      a first tube section connected to the apparatus and and a second tube section connected to the first tube section for threading cored elements that are threaded by said first tube section, said second tube section extending in said one direction with the longitudinal axis thereof substantially parallel and adjacent the path of movement of the member;
   means in said second tube section for facilitating a further threading of the element with a filament;
   means for transporting the cored element from a supply of cored elements to a position where the hole in the cored element is centered over said first tube section;
   means coupled to the element transporting means for indexing said table in said one direction to an element-threading position where the member is in a position to thread the hole in the cored element that is centered over said first tube section;
   element release means interposed between said element transporting means and said first tube section, said element release means being coupled to said indexing means for operating after the member is indexed to the element-threading position to release the centered cored element to said first tube section for subsequent simultaneous threading by the member and said second tube section; and
   means coupled to said indexing means and located adjacent the path of movement of the core-threaded member from the element-threading position, for staking the hole-threading end of the member to the article.

7. Apparatus for facilitating the assembly of a memory component characterized as a planar article, embodying a plurality of conductive loops terminating as individual members having free ends for receiving and threading individual apertured magnetic cores, the apparatus comprising:
   a table mounting the memory component for movement in one plane in at least one direction;
   a tube detachably connected to the apparatus for threading the apertures of the cores, the outer diameter of said tube being substantially smaller than the diameter of the core apertures, said tube including:
      a first tube section having a length thereof that substantially conforms to the configuration of the core-threading members proximate the free ends thereof, a second tube section connected to said first tube section and extending in said one direction with the longitudinal axis thereof substantially parallel and adjacent the path of movement of the members;
   a longitudinal passage in said second tube section for receiving at least one core-winding filament thereby facilitating the threading of the cores with the filament;
   means for transporting a core from a supply of cores to a position where the core aperture is centered over said first tube section;
   means coupled to the core-transporting means for indexing said table in said one direction to a core-threading position where the free end of a member is in a position to thread the aperture of a core that is threaded by said first tube section; and
   core release means interposed between said core transporting means and said first tube section, said core release means being coupled to the indexing means and operable after the member is indexed to the core-threading position to release the centered core to said first tube section for subsequent simultaneous threading by the member and said second tube section.

8. Apparatus for facilitating the assembly of a memory component characterized as a planar article, embodying a plurality of conductive loops that terminate as individual members having free ends for receiving and threading individual apertured magnetic cores, the apparatus comprising:
   a table mounting the memory component for movement in one plane in at least one direction;
   a tube detachably connected to the apparatus for threading the apertures of the cores, the outer diameter of said tube being substantially smaller than the diameter of the core apertures, said tube including:
      a first tube section having a length thereof that substantially conforms to the configuration of the core threading members proximate the free ends thereof, a second tube section connected to said first tube section and extending in said one direction with the longitudinal axis thereof substantially parallel and adjacent the path of movement of the members;

a longitudinal passage in said second tube section for receiving at least one core winding filament;

means for transporting a core from a supply of cores to a position where the core aperture is centered over said first tube section;

means coupled to the core transporting means for indexing said table in said one direction to a core-threading position where the free end of a member is in a position to thread the aperture of a core that is threaded by said first tube section;

core release means interposed between said core transporting means and said first tube section, said core release means being coupled to the indexing means and operable after the member is indexed to the core-threading position to release the centered core to said first tube section for subsequent simultaneous threading by the member and said second tube section; and means coupled to said indexing means for intercepting and staking the free end of the core-threaded member to the article upon subsequent indexing of the member from the core-threading position by further operation of the indexing means.

9. Apparatus for facilitating the assembly of a memory component characterized as a planar article, embodying a plurality of conductive loops that terminate as individual members having free ends for receiving and threading individual apertured magnetic cores, the apparatus comprising:

a table mounting the memory component for movement in one plane in at least one direction;

a drive shaft mounted for rotation in the apparatus;

a tube for threading the apertures of the cores, the outer diameter of said tube being substantially smaller than the diameter of the core apertures, said tube including:

a first tube section having a length thereof that substantially conforms to the configuration of the core-threading members proximate the free ends thereof, a second tube section connected to said first tube section and extending in said one direction with the longitudinal axis thereof subtanially parallel and adjacent the path of movement of the members;

a longitudinal passage in said second tube section for receiving at least one core winding filament;

means driven by said shaft for transporting a core from a supply of cores to a position where the core aperture is centered over said first tube section;

first and second pairs of jaws driven by shaft rotation for alternately closing and clamping said tube against movement while a core is threaded on said tube;

a nest formed by the closure of the second jaw pair for receiving and seating a core threaded by said tube, the opening of said second jaw pair subsequent to the opening of the first jaw pair releasing a core to said first tube section;

means driven by said shaft and coupled to the core transporting means for indexing said table in said one direction to a core-threading position where the free end of a member is in a position to thread the aperture of a core that is subsequently released to said first tube section by the opening of said second jaw pair; and means interposed between said second jaw pair and said first tube section and operated by movement of said table to retain a core released by said second jaw pair.

10. Apparatus for facilitating the assembly of a memory component characterized as a planar article, embodying a plurality of conductive loops terminating as individual members having free ends for receiving and threading individual apertured magnetic cores, the apparatus comprising:

a table mounting the memory component for movement in one plane in at least one direction;

a toothed rack connected to said table for driving said table in said one direction;

a drive shaft mounted for rotation in the apparatus;

a tube for threading the apertures of the cores, the outer diameter of said tube being substantially smaller than the diameter of the core apertures, said tube including:

a first tube section having a length thereof that substantially conforms to the configuration of the core threading members proximate the free ends thereof, a second tube section connected to said first tube section and extending in said one direction with the longitudinal axis thereof substantially parallel and adjacent the path of movement of the members;

a longitudinal passage in said second tube section for receiving at least one core winding filament;

a first slide mounted for reciprocation in directions perpendicular to said one direction driven by said shaft for transporting a core from a supply of cores to a position where the core aperture is centered over said first tube section;

a first and second pair of jaws under the control of said first slide and movable by said first slide for alternately closing and clamping said tube against movement while a core is threaded on said tube;

a nest formed by the closure of the second jaw pair for receiving and seating a core threaded by said tube, the opening of said second jaw pair subsequent to the opening of the first jaw pair releasing a core to said first tube section; and a rack-indexing element driven by said first slide for indexing said rack and table in said one direction to a core-threading position where the free end of a member is in a position to thread the aperture of a core that is subsequently released to said first tube section by the subsequent opening of said second jaw pair.

11. Apparatus for facilitating the assembly of a memory component characterized as a planar article, embodying a plurality of conductive loops terminating as individual members having free ends for receiving and threading individual apertured magnetic cores, the apparatus comprising:

a table mounting the memory component for movement in one plane in at least one direction;

a toothed rack connected to said table for advancing said table in said one direction;

a drive shaft mounted for rotation in the apparatus;

a tube for threading the apertures of the cores, the outer diameter of said tube being substantially smaller than the diameter of the core apertures, said tube including:

a first tube section having a length thereof that substantially conforms to the configuration of the core-threading members proximate the free ends thereof, a second tube section connected to said first tube section and extending in said one direction with the longitudinal axis thereof substantially parallel and adjacent the path of movement of the members;

a longitudinal passage in said second tube section for receiving at least one core-winding filament;

a slide mounted for reciprocation in directions perpendicular to said one direction, said slide being driven during a single revolution of said shaft to transport a core from a supply of cores to a position where the core aperture is centered over said first tube section;

first and second pairs of separable jaws under the control of said slide and movable by the reciprocative movement of said slide for alternately closing at predetermined intervals during a single revolution of said shaft to clamp said tube against movement while a core is threaded on said tube;

a nest formed by the closure of the second jaw pair for receiving and seating a core threaded by said tube, the opening of said second jaw pair subsequent to the opening of the first jaw pair releasing a core to said first tube section;

a rack-indexing element driven by movement of said slide for indexing said rack and table in said one direction to a core-threading position where the free end of a member is in a position to thread the aperture of a core that is released to said first tube section by the subsequent opening of said second jaw pair; and means driven by the rotation of said shaft for staking the free end of the core-threaded member to the article upon subsequent indexing of the member from the core-threading position.

12. Apparatus for facilitating the assembly of a memory component characterized as a planar article, embodying a plurality of conductive loops terminating as individual members having free ends for receiving and threading individual apertured magnetic cores, the apparatus comprising:

a table mounting the memory component for movement in one plane in at least one direction;

a toothed rack connected to said table for advancing said table in said one direction;

a drive shaft mounted for rotation in the apparatus;

a tube for threading the apertures of the cores, the outer diameter of said tube being substantially smaller than the diameter of the core apertures, said tube including:

a first tube section having a length thereof that substantially conforms to the configuration of the core-threading members proximate the free ends thereof, a second tube section connected to said first tube section and extending in said one direction with the longitudinal axis thereof substantially parallel and adjacent the path of movement of the members;

a longitudinal passage in said second tube section for receiving at least one core-winding filament;

a first slide mounted for reciprocation in directions perpendicular to said one direction, said first slide being driven during a single revolution of said shaft to transport a core from a supply of cores to a position where the core aperture is centered over said first tube section:

first and second pairs of separable jaws under the control of said first slide and movable by the reciprocative movement of said first slide for alternately closing at predetermined intervals during a single revolution of said shaft to clamp said tube against movement while a core is threaded on said tube;

a nest formed by the closure of the second jaw pair for receiving and seating a core threaded by said tube, the opening of said second jaw pair subsequent to the opening of the first jaw pair releasing a core to said first tube section;

a rack-indexing slide intermittently driven by said drive shaft during a single revolution thereof to engage said rack for indexing said rack and table in said one direction a first incremental distance;

a rack-indexing element driven by movement of said first slide for further indexing said rack and table in said one direction a second incremental distance, the successive indexings of the rack by operation of said rack-indexing slide and said rack-indexing element advancing a member to a position for threading the aperture of a core that is released to said first tube section by the subsequent opening of said second jaw pair; and a blade located first and second incremental distance in said one direction from said first tube section, said blade being driven by rotation of said shaft for staking the free end of the core-threaded member to the article after the first and second indexings of said rack-indexing slide and said rack-indexing element.

References Cited

UNITED STATES PATENTS

| | | | |
|---|---|---|---|
| 1,673,731 | 6/1928 | Brindle | 221—298 |
| 1,979,028 | 10/1934 | Ewart | 74—143 |
| 2,405,934 | 8/1946 | Alfandre | 29—241 X |
| 2,958,126 | 11/1960 | Shaw et al. | 29—203 X |

THOMAS H. EAGER, *Primary Examiner.*